United States Patent [19]

Kamon et al.

[11] Patent Number: 5,231,516
[45] Date of Patent: Jul. 27, 1993

[54] FOLDING-ORDER IMAGE FORMING APPARATUS

[75] Inventors: Kouichi Kamon, Yokohama; Takanobu Fujioka, Chofu; Hiroyuki Kawamoto, Kawasaki; Wataru Nara, Kawasaki; Norifumi Ito, Kawasaki, all of Japan

[73] Assignee: Ricoh Company, Ltd., Tokyo, Japan

[21] Appl. No.: 798,082

[22] Filed: Nov. 22, 1991

[30] Foreign Application Priority Data

Nov. 30, 1990 [JP] Japan ................... 2-334305
Nov. 30, 1990 [JP] Japan ................... 2-334306
Dec. 28, 1990 [JP] Japan ................... 2-415438
Oct. 16, 1991 [JP] Japan ................... 3-294777

[51] Int. Cl.⁵ ............... H04N 1/393; H04N 1/21; H04N 1/23
[52] U.S. Cl. ............... 358/449; 358/450; 358/451; 358/444; 358/296
[58] Field of Search ............... 358/296, 449, 450, 451, 358/401, 444; 355/319, 24, 25, 55, 75; 395/148, 115

[56] References Cited

U.S. PATENT DOCUMENTS

| | | | |
|---|---|---|---|
| 4,342,052 | 7/1982 | Rackley | 358/450 |
| 4,588,291 | 5/1986 | Lulay | 355/75 |
| 4,636,872 | 1/1987 | Prichard | 358/296 |
| 4,641,197 | 2/1987 | Miyagi | |
| 4,647,189 | 3/1987 | Fujiwara | 355/55 |
| 4,672,462 | 6/1987 | Yamada | 358/450 |

FOREIGN PATENT DOCUMENTS 61-156195 7/1986 Japan.
2-2346 1/1990 Japan.

Primary Examiner—Edward L. Coles, Sr.
Assistant Examiner—Scott A. Rogers
Attorney, Agent, or Firm—Mason, Fenwick & Lawrence

[57] ABSTRACT

In a folding-order image forming apparatus, image data provided by reading an original image are stored to a page memory. When a copy is made in an electrostatic photographic process in accordance with the image data, the read image data are processed to divide the original image into a plurality of divisional images. Required images with respect to the divisional images are rotated, rearranged and outputted by the operation of a page memory control circuit in accordance with a divisional number of a recording image, etc. Thus, the images are formed in an opening shape by folding or cutting a sheet of recording paper along a divisional boundary of images thereon. The image forming apparatus generally has an image signal memory for storing a digital image signal, a memory region controller for controlling an operation of the image signal memory in a memory region thereof and an image rotational processor for rotating an image by judging the necessity of rotational processing of an image every memory region of the image signal memory.

18 Claims, 39 Drawing Sheets

Fig. 9
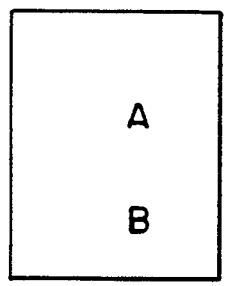  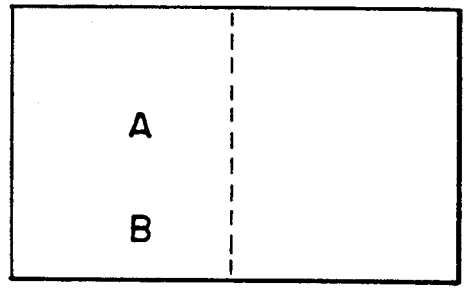
ORIGINAL OF SIZE A4
PAGE MEMORY OF SIZE A3
(a)
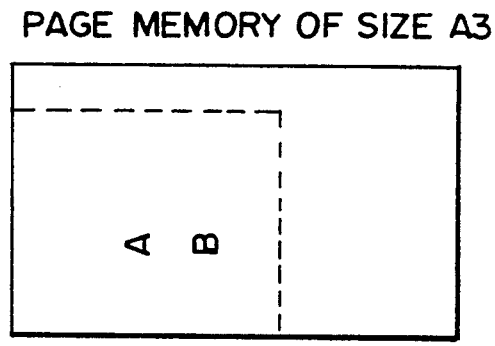
(b)
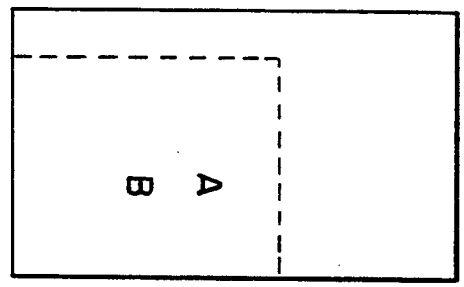
(c)
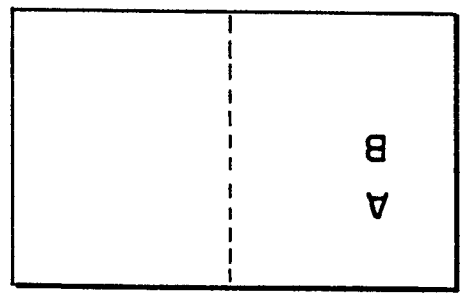
(d)

FRONT FACE
PAGE MEMORY 1

FRONT FACE
PAGE MEMORY 2

ORIGINAL OF SIZE A4

ORIGINAL OF SIZE A4

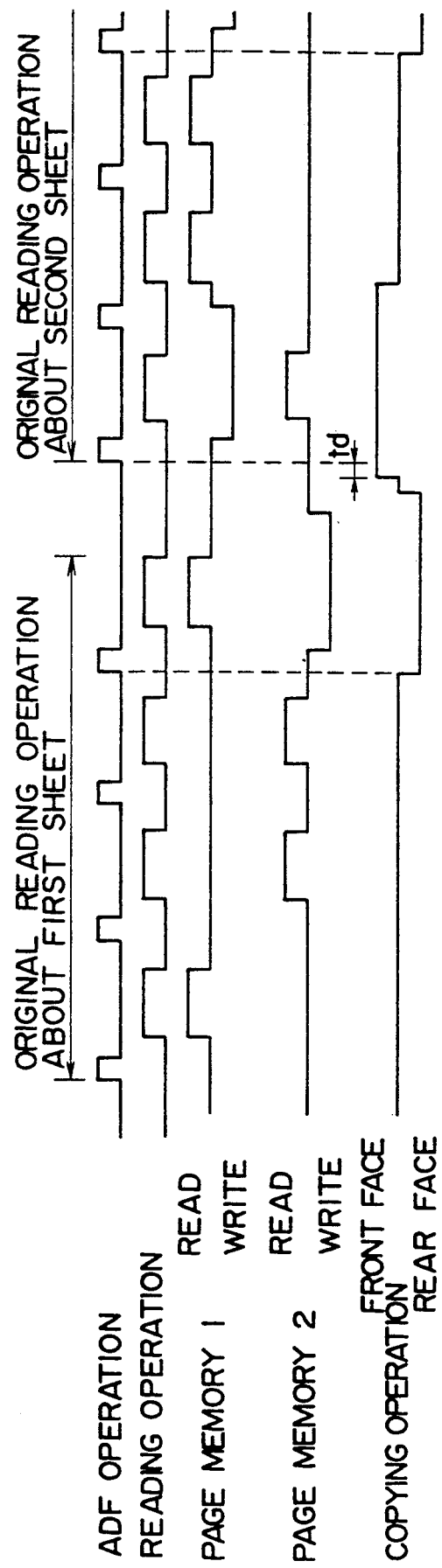

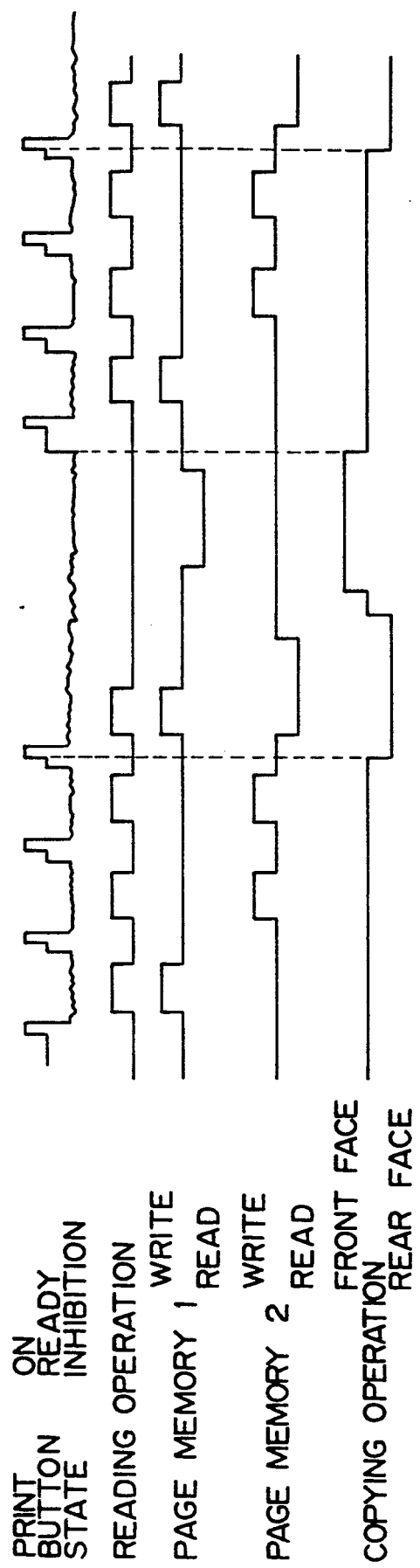

FRONT FACE

REAR FACE

FRONT FACE

REAR FACE

FRONT FACE

REAR FACE

FRONT FACE

REAR FACE

FOLDING-ORDER IMAGE FORMING APPARATUS

BACKGROUND OF THE INVENTION

1. Field of the Invention

The present invention relates to a folding-order image forming apparatus such as a digital copying machine provided with an image memory having a memory capacity of at least one frame of a recording image to store an image signal provided by reading images of plural originals or divisional originals and record plural images on one sheet of recording paper.

2. Description of the Related Art

In a digital copying machine, image data read from an original image can be easily processed and edited in various manners by a known image processing system. Accordingly, there are many proposals for fulfilling many functions of the copying machine.

For example, an image-data outputting circuit is proposed in Japanese Patent Application Laying Open (KOKAI) No. 61-156195. In this image-data outputting circuit, the original image is rotated ±90° and is processed and image data can be outputted by using effective methods for reading and writing the image data to a memory.

However, in such a general structure, it is impossible to perform data processing such as an image rotation by assigning a certain memory region within a page memory.

Further, a write starting or completing position, a read starting or completing position, and a stepping amount of data or a line unit are fixedly set when the page memory having a simple structure is used. Accordingly, for example, it is impossible to write or read the image data corresponding to paper size A4 from the page memory corresponding to paper size A3 by dividing these image data into two data sections.

When plural originals are copied and filed as a book by using a general copying machine, the plural originals are respectively copied and copied sheets thereof are stacked with each other.

For example, when plural double-sided originals are copied to form a document or material, it is necessary to bind the copied sheets by a stapler or a clip at any time even when a double-sided copying mode set within a recent copying machine as an additional function is used. Accordingly, when a large number of copies are required, it takes much time to bind the copied sheets and natural resources are uselessly used. Further, when plural copies such as copies reduced in size are bound into a recent business pocket notebook often used, no double-sided copying mode can be used and marginal portions of a paper sheet are uselessly used. Similar situations are caused when a copy enlarged in size is used.

SUMMARY OF THE INVENTION

It is therefore a first object of the present invention to provide a folding-order image forming apparatus in which a sheet of recording paper having an image thereon is simply folded or cut on the boundary of a unit image without useless labor so that, for example, a recording image is formed in an opening shape when plural or divisional originals are read to record images thereof on one sheet of recording paper, and the recording image is automatically arranged in a desirable recording order, or bound sheets of recording paper are automatically obtained in the desirable recording order.

A second object of the present invention is to provide an image data outputting circuit for processing inputted image data without any complicated circuit structure and performing image processings of the inputted image data such as rotation of an image and outputting the processed image data.

In accordance with a first structure of the present invention, the above first object of the present invention can be achieved by a folding-order image forming apparatus for forming a recording image in accordance with an image signal outputted from image signal memory means for storing a digital image signal, the folding-order image forming apparatus comprising memory region control means for controlling an operation of the image signal memory means in a memory region thereof; and image-rotational processing means for rotating an image by judging necessity of rotational processing of the image every memory region of the image signal memory means; the image signal memory means having a region for storing recording images on front and rear faces of a sheet of recording paper; and the image signal memory means further having a folding-order image forming mode as an image forming mode in which images on 2×2 pages are respectively recorded onto two equal divisional regions of one sheet of recording paper on both sides thereof.

In accordance with a second structure of the present invention, the above first object of the present invention can be also achieved by a folding-order image forming apparatus for forming a recording image in accordance with an image signal outputted from image signal memory means for storing a digital image signal, the folding-order image forming apparatus comprising memory region control means for controlling an operation of the image signal memory means in a memory region thereof; and image-rotational processing means for rotating an image by judging necessity of rotational processing of the image every memory region of the image signal memory means; the image signal memory means having a region for storing a recording image on one sheet of recording paper; and the image signal memory means further having a folding-order image forming mode as an image forming mode in which images on two pages are respectively recorded onto two equal divisional regions of one sheet of recording paper.

In accordance with a third structure of the present invention, the above first object of the present invention can be also achieved by a folding-order image forming apparatus for forming a recording image in an electrostatic photographic process in accordance with an image signal outputted from image signal memory means for storing a digital image signal, the folding order image forming apparatus comprising memory region control means for controlling an operation of the image signal memory means in a memory region thereof in accordance with a reading order of an original image; and image divisional means for processing the image signal stored to the image signal memory means and dividing read data of the original image into a plurality of divisional image data; the image signal memory means having a region for storing a recording image on one sheet of recording paper; and the image signal memory means further having a folding-order image forming mode as an image forming mode in which original images on plural pages are respectively formed on plural divisional regions of one sheet of recording paper on both sides thereof; and the one sheet of recording paper is folded or cut along a divisional boundary to form an image-recording object having an opening shape.

In accordance with another structure of the present invention, the above second object of the present invention can be achieved by an image data outputting circuit comprising an image memory for storing image data read every line; and image memory control means for controlling inputting and outputting operations of the image data of the image memory; the image memory control means having write-starting position setting means for designating a write starting position of the image memory; write-completing position setting means for designating a write completing position of the image memory; and data-unit stepping-amount setting means for designating a write-data unit stepping amount for stepping a writing position of the image memory; the image memory control means controlling a writing operation of the image data in accordance with the designated write starting position, the designated write completing position and the designated write-data unit stepping amount.

In the above structures of the present invention, the memory region control means controls an operation of the image signal memory means in the memory region thereof in accordance with a reading order of the original image. The image divisional means processes an image signal stored to the image signal memory means and divides read data of the original image into a plurality of divisional image data.

The image figure combining means combines the original image with another figure image. The image-rotational processing means judges the necessity of rotational processing of the image every memory region of the image signal memory means and rotates this image. Further, the image memory control means starts the writing operation of the image data from the write starting position of the image memory designated by the write-starting position setting means. The image memory control means steps the writing position of the image memory every write-data unit stepping amount designated by the data-unit stepping-amount setting means. The image memory control means further completes the writing operation of the image data in the write completing position designated by the write-completing position setting means.

In the folding-order image forming apparatus, a sheet of recording paper having an image thereon is simply folded or cut on the boundary of a unit image without useless labor. Accordingly, for example, the recording image is formed in an opening shape when plural or divisional originals are read to record images thereof on one sheet of recording paper, and the recording image is automatically arranged in a desirable recording order, or bound sheets of recording paper are automatically obtained in the desirable recording order.

Further, the image data outputting circuit processes inputted image data without any complicated circuit structure and performs image processings of the inputted image data such as rotation of an image and outputs the processed image data.

Further objects and advantages of the prevent invention will apparent from the following description of the preferred embodiments of the present invention as illustrated in the accompanying drawings.

BRIEF DESCRIPTION OF THE DRAWINGS

FIG. 9 is an explanatory view showing a storing state of image data in the page memory and corresponding to recording paper size A3;

FIG. 14 is a timing chart of the copying machine when a sheet of the original is fed by using an automatic document feeder (ADF);

FIG. 15 is a timing chart of the copying machine when the sheet of the original is manually fed;

DESCRIPTION OF THE PREFERRED EMBODIMENTS

The preferred embodiments of a folding-order image forming apparatus in the present invention will next be described in detail with reference to the accompanying drawings.

Figure 1:
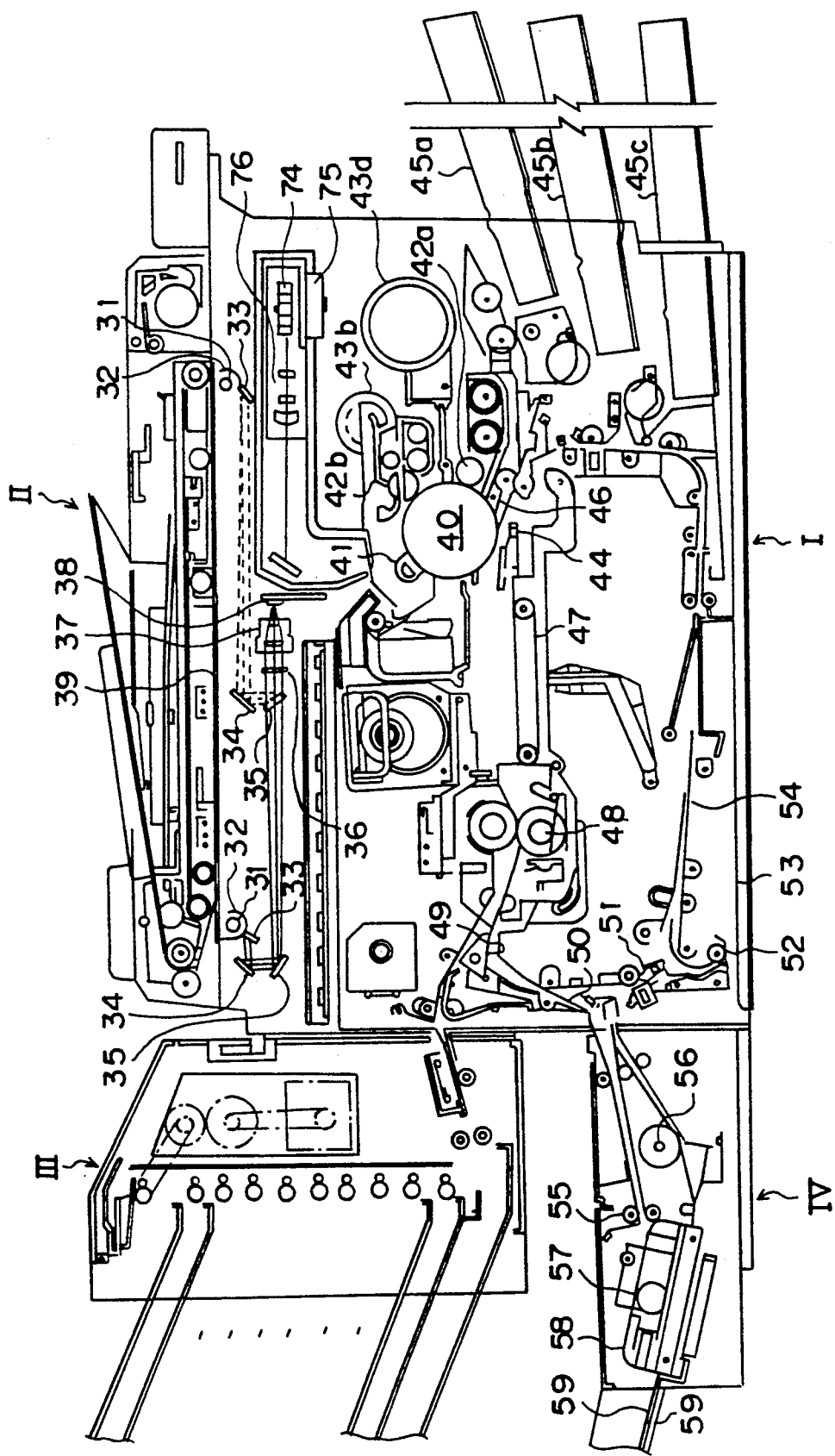
FIG. 1 is a constructional view of the entire structure of a copying machine in accordance with a first embodiment of the present invention.
Figure 2:
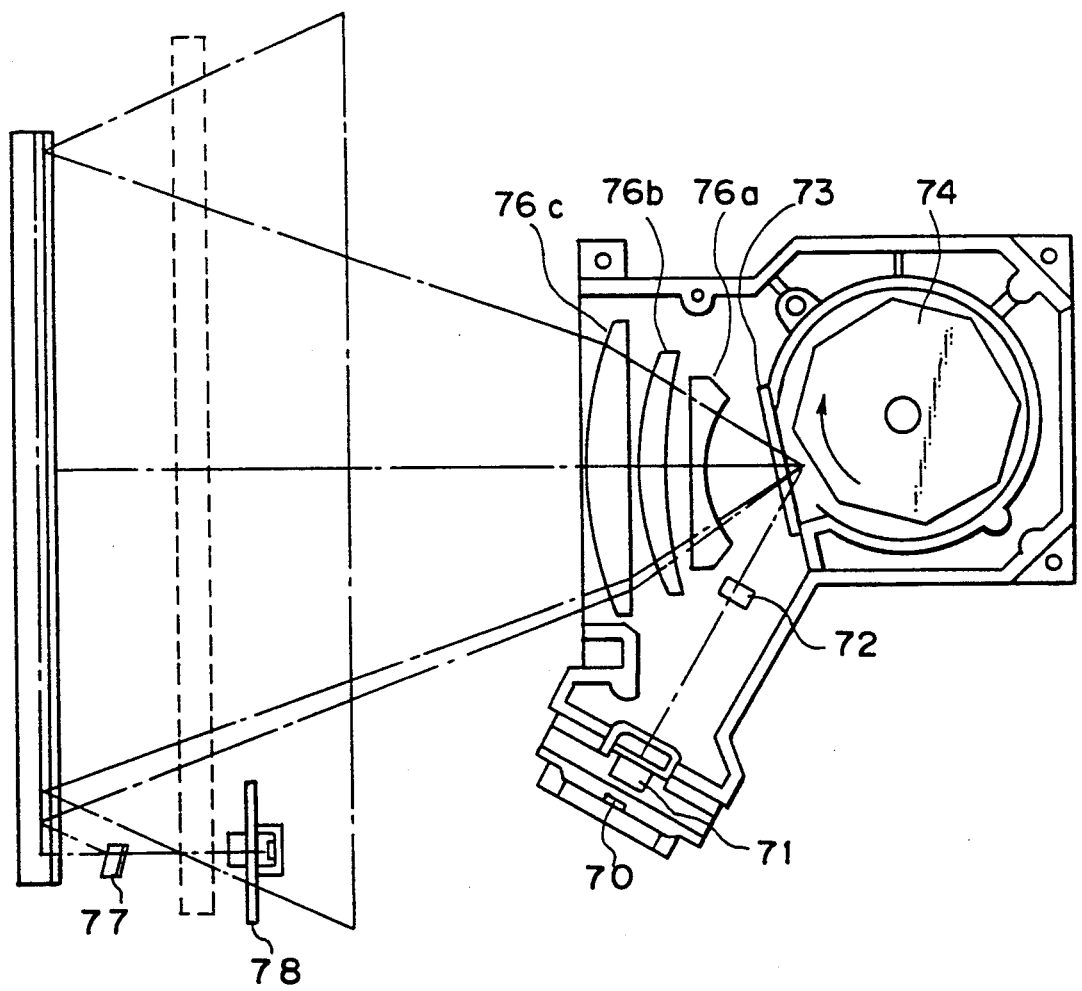
FIG. 2 is a plan view of a writing section of the copying machine.

FIG. 1 is a view showing the entire structure of a digital copying machine in accordance with a first embodiment of the present invention. FIG. 2 is a plan view of a writing section disposed in this copying machine.

A schematic structure of the digital copying machine will next be described in detail with reference to FIG. 1. As shown in FIG. 1, the digital copying machine is constructed by a copying machine body I, an automatic document feeder (ADF) II, a sorter III and a double-sided reversing unit IV. The copying machine body I is constructed by a scanner section, a writing section, an exposure section, a developing section, a paper feeding section, etc. Constructions and operations of the respective constructional sections in the copying machine body I will next be explained.

The scanner section will first be explained.

As shown in FIG. 1, the scanner section is constructed by first and second scanners. The first scanner has a light source 31, a reflecting mirror 32 for reflecting light from the light source 31, and a first mirror 33. The first scanner is moved at a constant speed. The second scanner has a second mirror 34 and a third mirror 35 and is moved in accordance with the movement of the first scanner. An original arranged on a contact glass 39 is optically scanned by the first scanner. Light reflected from the original is guided to a lens 37 through a color filter 36 and an image of the original is focused and formed as an image on a one-dimensional solid-state image sensor 38. The solid-state image sensor 38 is constructed by a charge coupled device (CCD). The color filter 36 is arranged such that the color filter 36 can be moved into and out of an optical path. Such moving operations of the color filter 36 are performed in accordance with a scanning operation of the original so as to make various kinds of copies such as a transfer copy, a double-sided copy in combination with various kinds of functions for these copies.

As described later, an analog signal of an image read by the solid-state image sensor 38 is converted to a digital signal by an analog/digital (A/D) converter. The digital signal is processed and outputted after various kinds of image processings about this digital signal such as multivalued processing, gradational processing, zooming processing, editing, etc. using an image processing unit.

The writing section will next be explained.

In the writing section, image information after the image processings is converted to information of lightness and is written onto a photosensitive body drum by the raster scan of a laser beam. A semiconductor laser is used as a light source of the laser beam.

In FIG. 2, the laser beam emitted from a semiconductor laser 70 is changed to a parallel light beam by a collimator lens 71 and is shaped by an aperture 73. The shaped laser beam is then compressed by a first cylindrical lens 72 in a cross scanning direction. Thereafter, the compressed beam is incident to a polygon mirror 74.

The polygon mirror 74 is rotated by a polygon motor 76 at a constant speed and has a polygonal columnar shape. An outer circumferential face of the polygon mirror 74 parallel to an axis thereof constitutes a reflecting face of the laser beam. The laser beam reflected on the rotary polygon mirror 74 is deflected and sequentially incident to fθ lenses 76a, 76b and 76c. After the light beam is transmitted through the fθ lenses 76a, 76b and 76c, the laser beam is reflected on a synchronous detecting mirror 77 outside an image recording region and is detected by a synchronizing sensor 78. When the light beam is detected by the synchronizing sensor 78, the synchronizing sensor 78 outputs a synchronizing signal for heading in a main scanning direction.

The exposure section will next be explained.

A surface of the photosensitive body drum 40 is uniformly charged by a charger 41 at about −800 volts. When the laser beam is irradiated onto the surface of the photosensitive body drum 40, an electric potential on this irradiated surface is reduced to about −500 volts at its maximum. Thus, the latent image of a recording image is formed by the raster scan of the laser beam in which light intensity is changed in accordance with a recording signal.

The developing section will next be explained.

A main developing device 42a and a sub-developing device 42b are disposed in the developing section. For example, black toner and color toner are respectively supplied into toner supplying devices 43a and 43b. Then, colors of the black and color toners are selected in synchronization with a switching operation of the color filter 36 in the scanner section. Thus, it is possible to make a multi-functional color copy in accordance with multiple transfers, etc.

An image of the original is developed by the developing devices 42a and 42b and is then transferred by the charging operation of a transfer charger 44 onto a sheet of transfer paper fed in synchronization with the rotation of the photosensitive body drum 40. Charges on the sheet of transfer paper having the transferred image thereon are removed therefrom by an alternating current. The sheet of transfer paper is then separated from the photosensitive body drum 40 and is sucked onto a separating conveying belt 47.

The paper feeding/conveying section will next be explained.

An uppermost sheet of transfer paper is taken out of one of plural paper feeding cassettes 45a, 45b and 45c and is fed until a front end of the paper sheet hits against a resisting roller 46. The resisting roller 46 feeds the sheet of transfer paper to a transfer position in synchronization with an image forming operation of the photosensitive body drum 40. The sheet of transfer paper having the image transferred by the charging operation of the transfer charger 44 is conveyed by the separating conveying belt 47 to a fixing roller 48 so that the transferred image is heated and fixed by the fixing roller 48 onto the sheet of transfer paper.

In a normal copying mode, the fixed sheet of transfer paper is discharged onto a side of the sorter III by the switching operation of a switching claw 49. In contrast to this, in a multiple copying mode, the switching claw 49 is switched onto the side of a paper re-feeding path 54 so that the sheet of transfer paper is again fed to the resisting roller 46 through switching claws 50 and 51 and the paper re-feeding path 54. When a double-sided copy is made in the copying machine body I, the switch claw 51 is switched onto the side of a reversing roller 52 so that the sheet of transfer paper is guided to the paper re-feeding path 54 through a paper reversing operation of the reversing roller 52.

Mechanisms and operations of the automatic document feeder II, the sorter III and the double-sided reversing unit IV are similar to those in the general copying machine and do not relate to the features of the present invention. Accordingly, explanations about the mechanisms and the operations of the automatic document feeder II, the sorter III and the double-sided reversing unit IV are omitted in the following description.

An electric control section of the copying machine will next be described.

Figure 5:
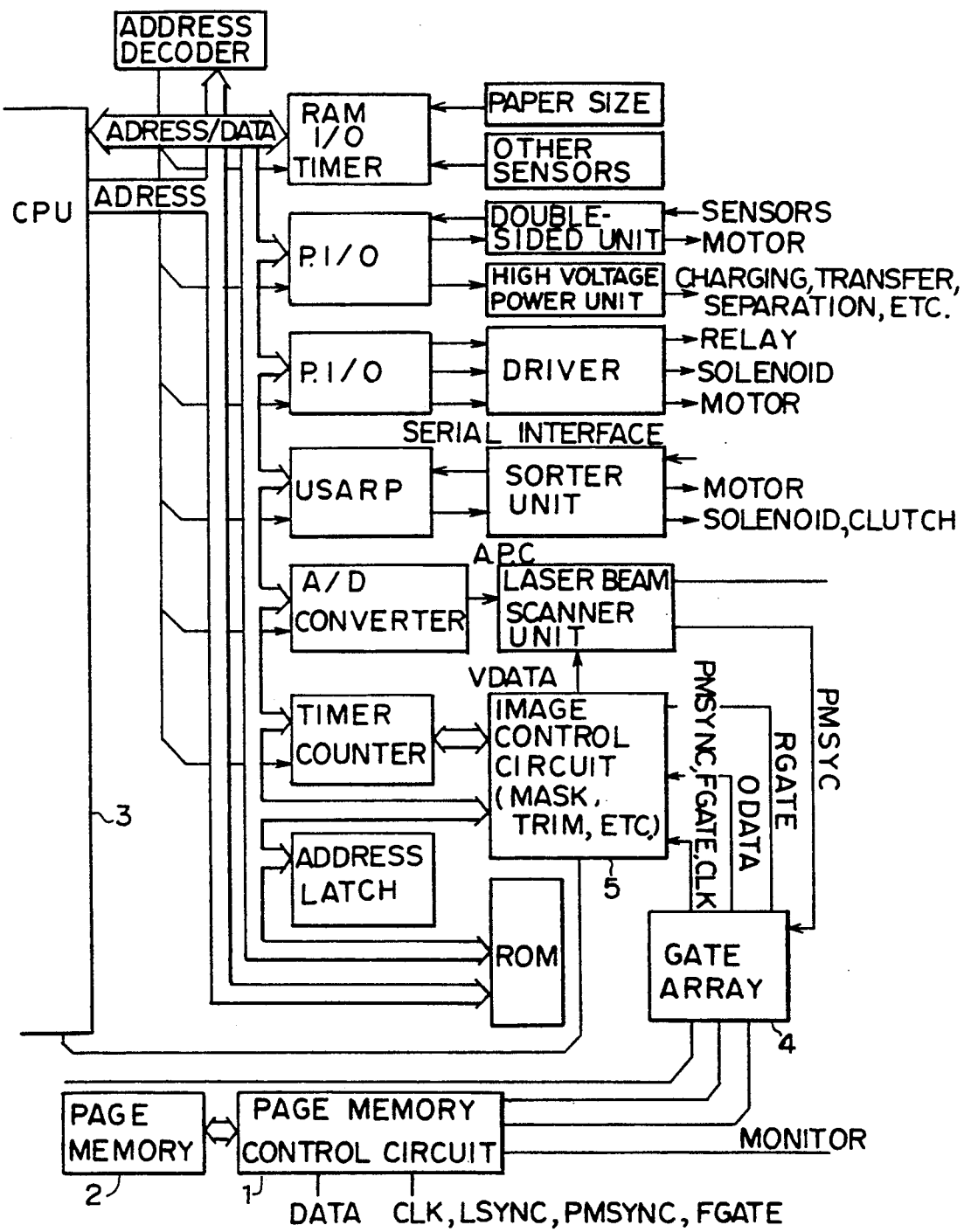
FIG. 5 is a circuit block diagram of a control unit for sequential control in the entire copying machine.

FIG. 5 is a circuit block diagram of a control unit for sequential control in the entire copying machine. A summary of the sequential control will next be described with reference to FIG. 5. A paper size sensor and various kinds of sensors for the detection of a discharged paper sheet, a resisting detection, etc. are connected to a central processing unit (CPU) 3. Further, a double-sided unit, a high voltage power source unit, a relay and a solenoid are connected to the central processing unit 3. Further, drivers of a motor, etc., a sorter unit, a laser unit, etc. are connected to the central processing unit 3. For example, timing of paper conveyance, etc. are controlled by the central processing unit 3.

The paper size sensor detects a size of sheets of transfer paper stored in each of the paper feeding cassettes 45 and also detects a paper feeding direction. The paper size sensor outputs detecting signals indicative of the paper size and the paper feeding direction. The high voltage power source unit applies predetermined high voltages to the charger 41, the transfer charger 44, a separating charger and a developing bias electrode, respectively. An A/D converter and an analog input of the central processing unit 3 are used to constantly control a light emitting output of the semiconductor laser 70 constructed by a laser diode and control a monitor voltage such that this monitor voltage is in conformity with a reference voltage.

An image control circuit 5 generates timing signals of masking, trimming, erasing, a photosensor pattern, etc. of a recording image and transmits a video signal VDATA to the laser diode 70.

At a binary processing time, a gate array 4 receives a 2-bit parallel image signal read by a scanner and outputted from the page memory control circuit 1. At a multivalued processing time, the gate array 4 receives an 8-bit parallel image signal read by the scanner and outputted from the page memory control circuit 1. The gate array 4 also receives a polygon motor synchronizing signal PMSYNC and an image writing-out signal RGATE outputted from a laser beam scanner unit. The gate array 4 then outputs an image signal ODATA converted to 4-bit serial data.

The page memory control circuit 1 once stores image data DATA outputted from an electric zooming circuit 86 to a page memory 2 having a memory capacity corresponding to two sheets of paper having size A3. The page memory control circuit 1 controls these image data such that the image data are outputted to a printer.

A summary of operational control will next be explained. The central processing unit 3 controls the operations of plural serial ports and a calendar integrated circuit (IC). The serial ports are connected to the central processing unit 3, an operating section, the scanner, an interface unit, etc.

The operating section has an indicator for displaying an operating state of the copying machine. The indicator also displays key input information inputted by the key input of an operator through the central processing unit 3. Information about image processing and image reading are received and transmitted between the operating section and the scanner.

Figure 4:
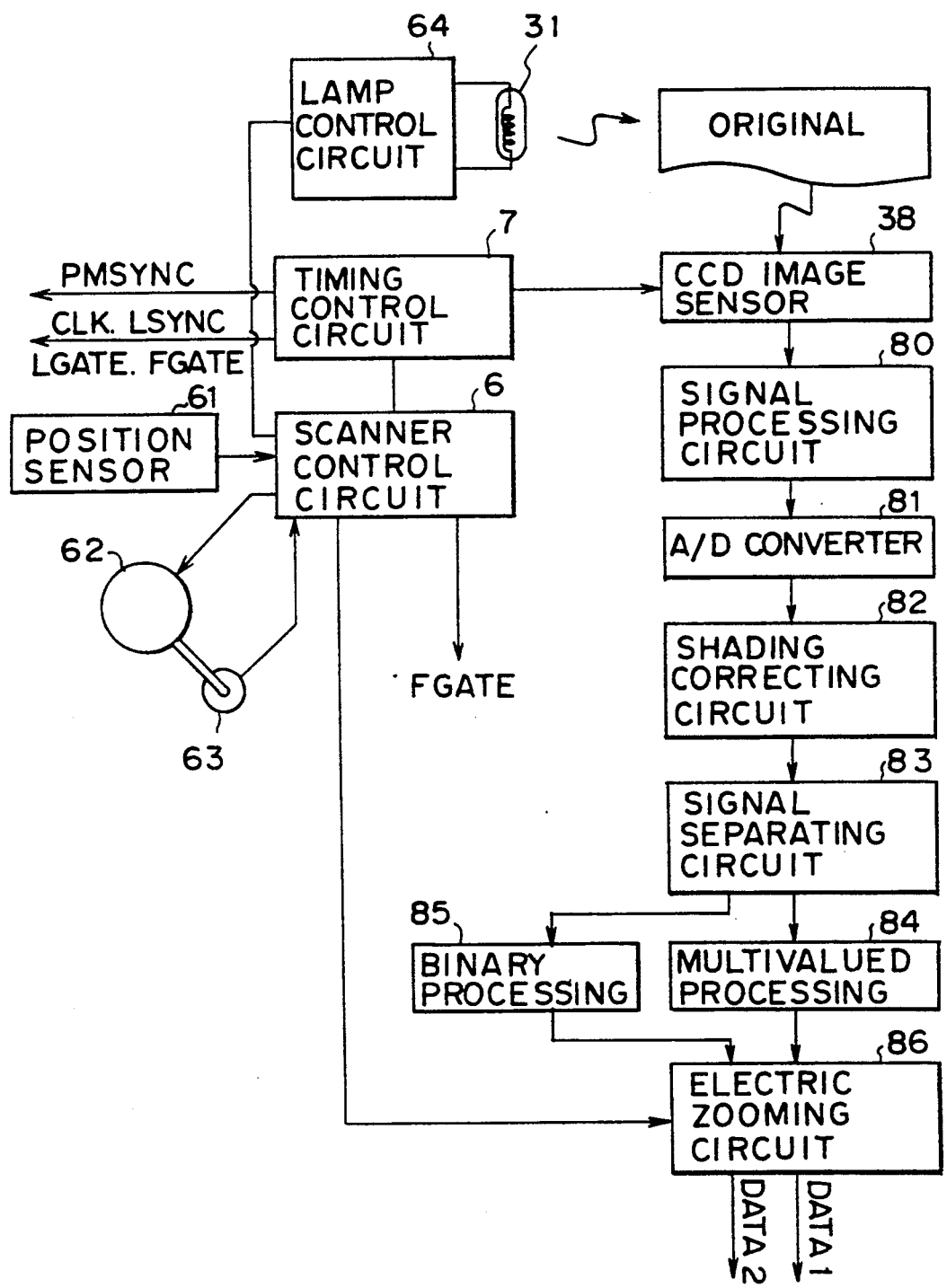
FIG. 4 is a block diagram of an image pocesssing circuit disposed in a scanner section of the copying machine.

FIG. 4 is a block diagram of an image processing circuit disposed in the scanner section. A schematic operation of this image processing circuit will next be described with reference to FIG. 4.

An analog image signal is outputted from the solid-state image sensor (CCD) 38 by reading an original image and is amplified by a signal processing circuit 80. The amplified signal is converted to a digital multivalued signal by an A/D converter 81. The digital multivalued signal is then corrected by a shading correcting circuit 82 with respect to the distortion of image data caused by an optical system. A signal separating circuit 83 separates the image data inputted thereto into a binary image component signal indicative of character information, etc. and a multivalued image component signal indicative of an intermediate gradational image. The binary image component signal is inputted to a binary processing circuit 85. The multivalued image component signal is inputted to a multivalued processing circuit 84. The binary processing circuit 85 converts multivalued data inputted thereto to binary data by using a threshold value set in advance. The multivalued processing circuit 84 judges input data every scanning position by using a threshold value set in advance and outputs the input data as image data composed of 16 values and showing the intermediate gradational image. The electric zooming circuit 86 performs electric zooming processing of the binary image data or the multivalued image data in accordance with zoom ratio data in a main scanning direction outputted from a scanner control circuit 6.

The scanner control circuit 6 controls the operations of a lamp control circuit 64, a timing control circuit 7, the electric zooming circuit 86 and a scanner drive motor 62 in accordance with commands of a printer control section. Namely, when the scanner control circuit 6 receives commands for starting the reading operation of an original from the printer control section, the scanner control circuit 6 controls the operation of the lamp control circuit 64 to turn an exposure lamp 31 on. Further, the scanner control circuit 6 starts to rotate the scanner drive motor 62 and controls the operation of the timing control circuit 7 to start the reading operation of the original by the solid-state image sensor (CCD) 38. The lamp control circuit 64 turns the exposure lamp 31 on and controls a quantity of light emitted from this exposure lamp in accordance with commands of the scanner control circuit 6.

A rotary encoder 63 is connected to a drive shaft of the scanner drive motor 62 and detects an angle of rotation of the scanner drive motor 62 and outputs a detecting signal indicative of this angle of rotation. A position sensor 61 detects a reference position of a movement of the scanner in a cross scanning direction and transmits a detecting signal indicative of this reference position.

A transfer signal for transferring image data on one line to a shift register is transmitted from the timing control circuit 7 to the CCD image sensor 38. A shift clock pulse for outputting the image data held by the shift register every one bit is also transmitted from the timing control circuit 7 to the CCD image sensor 38. The timing control circuit 7 also outputs an image-synchronizing clock pulse CLK, a main-scanning synchronizing signal LSYNC, a main-scanning effective-period signal FGATE and a cross-scanning effective-period signal FGATE to the laser beam scanner control unit.

The shift clock pulse transmitted to the CCD image sensor 38 is approximately equal to the image-synchronizing clock pulse CLK. The main-scanning synchronizing signal LSYNC is approximately equal to the polygon-motor synchronizing signal PMSYNC. The shift clock pulse and the main-scanning synchronizing signal LSYNC are not outputted when no original image is read. A voltage level of the main-scanning effective-period signal LGATE is set to a high voltage level H for only an effective period of the image signal DATA. A voltage level of the cross-scanning effective-period signal FGATE is set to a high voltage level H when the original begins to be read. The voltage level of the cross-scanning effective-period signal FGATE is changed to a low voltage level L after a time required to scan the original by the scanner by a maximum reading length thereof in the cross scanning direction (e.g., a longitudinal size in the case of paper size A4) has passed. In this embodiment, the CCD image sensor 38 outputs effective image data of 4800 bits per one line.

Figure 3:
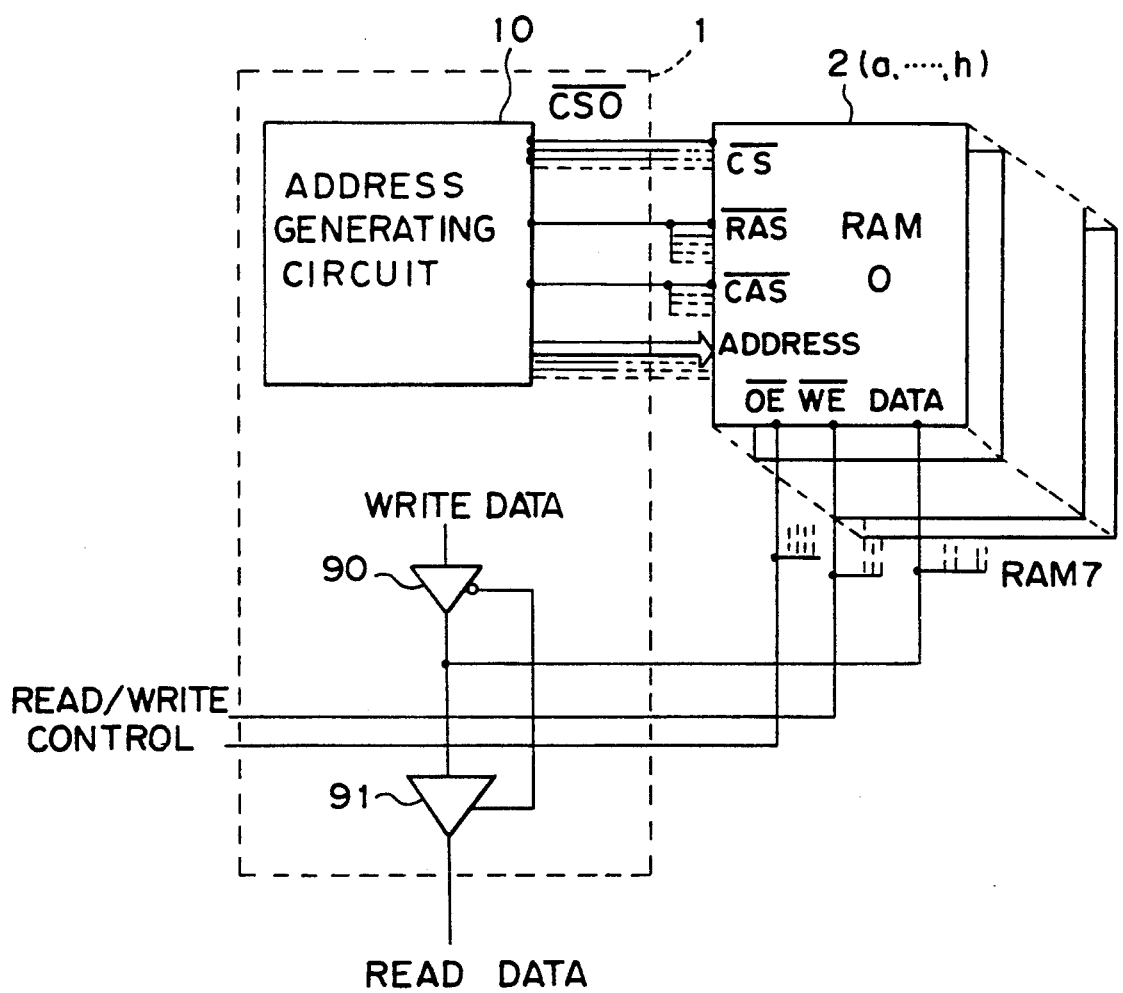
FIG. 3 is a block diagram of the detailed structures of a page memory and a page memory control circuit disposed in the copying machine in the first embodiment of the present invention.

FIG. 3 is a block diagram of detailed structures of the page memory 2 and the page memory control circuit 1. The page memory 2 is constructed by eight D-RAMSs 2a to 2h. The page memory control circuit 1 is constructed by an address generating circuit 10 and two three-state buffers (TSBs) 90 and 91.

Write image data DATA are transmitted to the page memory 2 by validating an output of the buffer (TSB) 90 by a reversing signal of a write control signal. One of the D-RAMs 2a to 2h is selected by a chip selecting signal (CS) transmitted from the address generating circuit 10. A predetermined address within a RAM is assigned by a low address signal (RAS), a column address signal (CAS) and an address signal and the write image data are stored to the RAM in this predetermined address.

At a data reading time, an output of the buffer (TSB) 91 is validated by a read control signal. Further, the predetermined address within the RAM is assigned by the chip selecting signal (CS), the low address signal (RAS), the column address signal (CAS) and the address signal generated from the address generating circuit 10. The image data DATA stored in this predetermined address are read out of the RAM.

Figure 6:
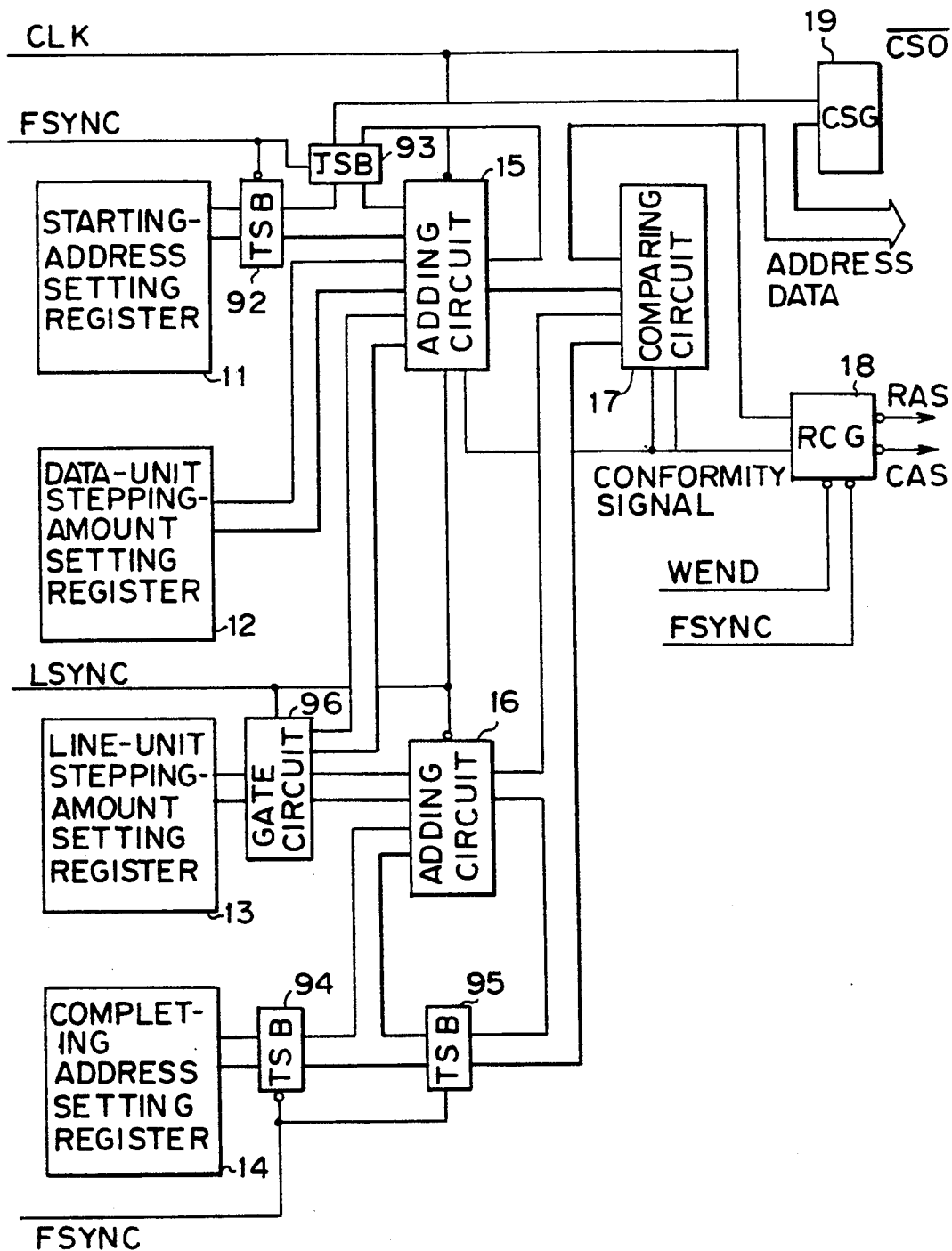
FIG. 6 is a block diagram of the detailed structure of an address generating circuit.
Figure 7:
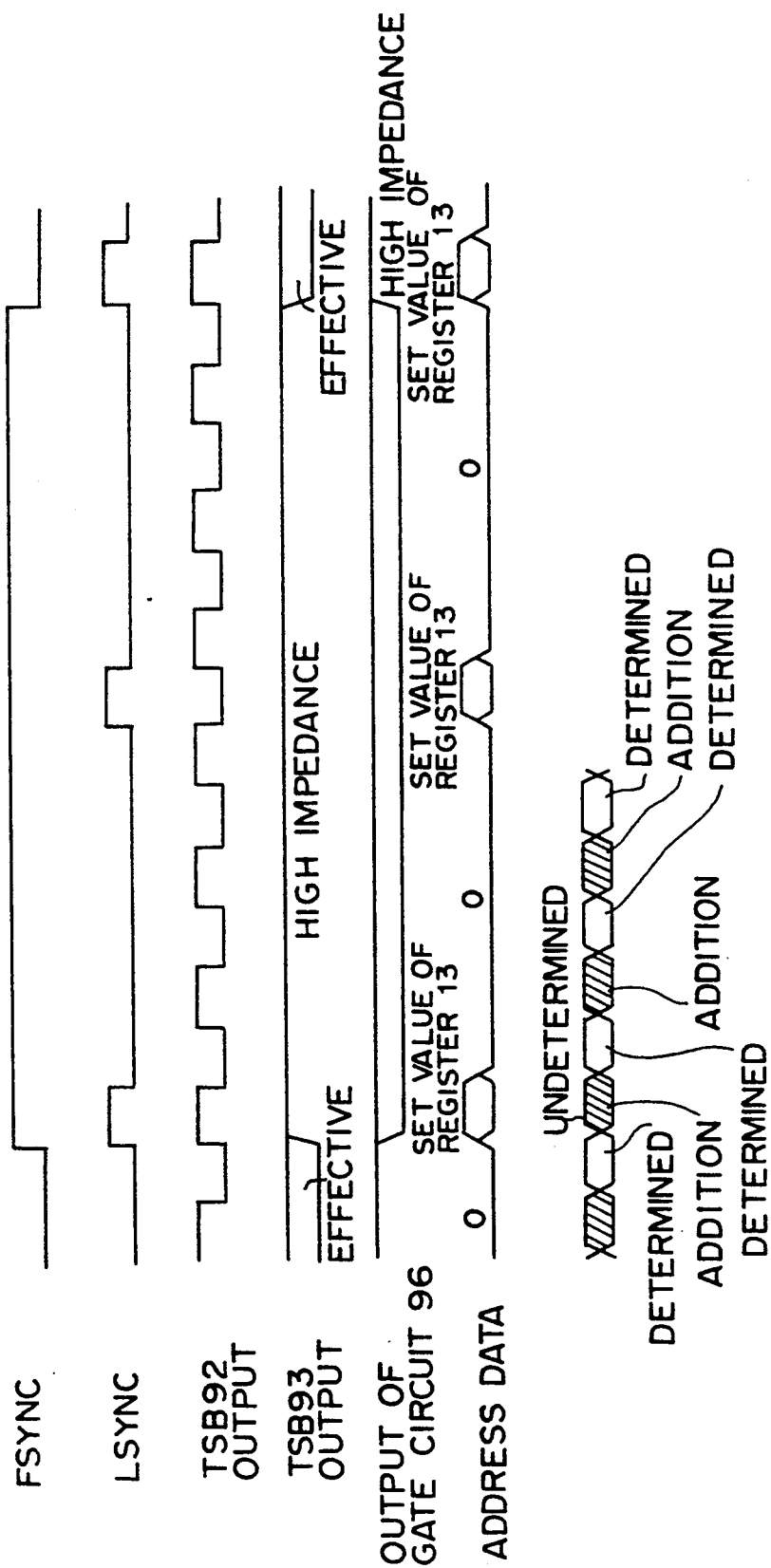
FIG. 7 is a timing chart of main input and output signals in the detailed address generating circuit.

FIG. 6 is a block diagram of the detailed address generating circuit 10. FIG. 7 is a timing chart of main input and output signals of the address generating circuit 10. An operation of the address generating circuit 10 at a data writing time will next be described with reference to FIGS. 6 and 7.

When the voltage level of the cross-scanning effective-period signal FGATE is first set to a low voltage level L, an output of a buffer (TSB) 92 is validated and an output of a buffer (TSB) 93 has a high impedance. Further, a set value of a starting-address setting register 11 is outputted to an adding circuit 15. Accordingly, the set value of the starting-address setting register 11 is set to an initial value of the adding circuit 15. When the voltage level of the cross-scanning effective-period signal FGATE is changed from the low voltage level L to a high voltage level H, the output of the buffer (TSB) 92 has a high impedance and the output of the buffer (TSB) 93 is validated. Accordingly, the adding circuit 15 adds output data of the buffer (TSB) 93 to a set value of a data-unit stepping-amount setting register 12 every input of the image-synchronizing clock pulse CLK.

A gate circuit 96 transmit input data thereof when the voltage level of the main-scanning synchronizing signal LSYNC is equal to a high voltage level H. In contrast to this, the gate circuit 96 interrupts the input data (at a zero voltage level) when the voltage level of the main-scanning synchronizing signal LSYNC is equal to a low voltage level L. Accordingly, when the voltage level of the cross-scanning effective-period signal FGATE is equal to the high voltage level H and the voltage level of the main-scanning synchronizing signal LSYNC is changed to the high voltage level H, the adding circuit 15 adds the set value of the data-unit stepping-amount setting register 12, a set value of a line-unit stepping-amount setting register 13 and output data of the adding circuit 15 to each other. When the voltage level of the main-scanning synchronizing signal LSYNC is changed to the low voltage level L, the adding circuit 15 adds the set value of the data-unit stepping-amount setting register 12 and the output data of the adding circuit 15 to each other every input of the image-synchronizing clock pulse CLK.

An output of a buffer (TSB) 94 is validated when the voltage level of the cross-scanning effective-period signal FGATE is equal to the low voltage level L. Accordingly, a set value of a completing-address setting register 14 is transmitted to an adding circuit 16. When the voltage level of the cross-scanning effective-period signal FGATE is equal to the high voltage level H and the voltage level of the main-scanning synchronizing signal LSYNC is changed to the high voltage level H, the gate circuit 96 is opened and an output of a buffer (TSB) 95 is validated. Accordingly, the adding circuit 16 adds an output value of this buffer 95 and the set value of the line-unit stepping-amount setting register 13 to each other. An output value of the adding circuit 16 is inputted to a comparing circuit 17 and is compared by this comparing circuit 17 with an output value of the adding circuit 15. When the output value of the adding circuit 16 is in conformity with that of the adding circuit 15, the comparing circuit 17 outputs a conformity signal.

A RAS/CAS generating circuit (RCG) 18 stops generations of the low address signal (RAS) and the column address signal (CAS) when the voltage level of any one of the signal FGATE, a write completing signal (WEND) and the conformity signal is changed to a low voltage level L. Then, the RAS/CAS generating circuit (RCG) 18 begins to generate the signals RAS and CAS when the voltage level of the signal LSYNC is changed to the high voltage level H. A chip-selecting signal generating circuit 9(CSG) 19 transmits address data and the chip selecting signal CS to the page memory 2.

Figure 8:
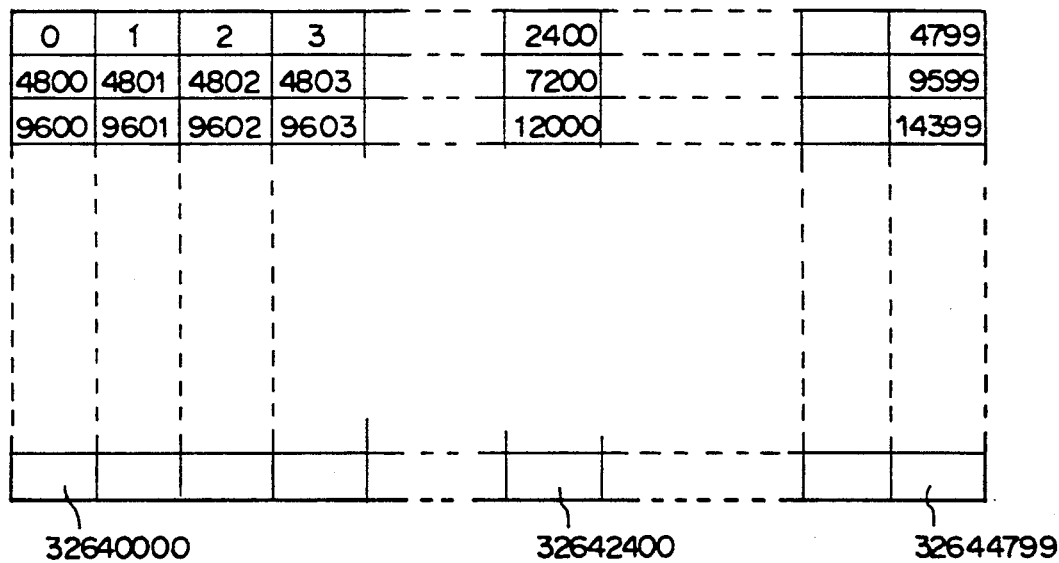
FIG. 8 is a typical view showing a memory construction of the page memory.

FIG. 8 is a typical view showing a structure of the page memory 2 having a memory capacity of paper size A3 in which addresses are allocated in each dot unit of two bits. Data corresponding to a length twice that of a shorter side of paper size A4 can be transversally stored into this page memory 2. Further, data corresponding to the length of a longer side of paper size A4 can be longitudinally stored into this page memory A concrete writing operation of the page memory control circuit 1 will next be described with reference to FIG. 8.

For example, set values of the starting-address setting register 11, the data-unit stepping-amount setting register 12, the line-unit stepping-amount setting register 13 and the completing-address setting register 14 are respectively set to 0; 1; 2400; and 4800 and 2400. In this case, a normal writing operation is performed so that the write data DATA begin to be written to the memory from first address 0. The addresses are stepped one by one every input of the image-synchronizing clock pulse CLK so that the write data are written to the memory until address 2400. When the write data have been completely written to the memory until the address 2400, an output voltage level of the comparing circuit 17 is changed to a low voltage level L. Accordingly, generations of the signals RAS and CAS from the RAS/CAS generating circuit (RCG) 18 are stopped so that no writing operation of the image data DATA is performed. Further, no additional operation of the adding circuit 15 is performed so that address data of the adding circuit 15 is held in the address 2400.

When the voltage level of the signal LSYNC is next changed to the high voltage level H, the set values of the line-unit stepping-amount setting register 13 and the completing-address setting register 14 are added to each other by the adding circuit 16 so that the address data are provided in addresses 4800 and 7200. These address data are compared by the comparing circuit 17 with address data outputted from the adding circuit 15. An output of the comparing circuit 17 shows a high voltage level H so that the address data of the adding circuit 15 again begin to be stepped and the image data DATA again begin to be written to the page memory 2. This writing operation is repeatedly performed until the voltage level of the signals FGATE or WEND is changed to a low voltage level L.

The image data DATA are sequentially read out of the page memory from address 0. Accordingly, a copied image is recorded by a printer in an arranging direction equal to that at the reading time of the original.

The next description relates to an image processing case corresponding to processing in which the recording image is rotated 180°. The set values of the starting-address setting register 11, the data-unit stepping-amount setting register 12, the line-unit stepping-amount setting register 13 and the completing-address setting register 14 are respectively set to 12,000; −1; −2400; and 4800 and 9600. In this case, the number of addresses is subtracted from address 12,000 one by one and the image data DATA are written to the page memory until address 9600. When an inputting operation of the next signal LSYNC is performed, the image data DATA again begin to be written to the page memory from address 7200.

In an image processing case corresponding to processing in which the recording image is rotated 90°, the set values of the starting-address setting register 11, the data-unit stepping-amount setting register 12, the line-unit stepping-amount setting register 13 and the completing-address setting register 14 are respectively set to 2400; 4800; −9601; and 1 −and 12,000. In this case, the image data DATA are first written to the page memory in address 2400 and are sequentially written to the page memory in addresses 7200 and 12,000. When the inputting operation of the next signal LSYNC is performed, the image data DATA are written to the page memory in an order of addresses 2399, 7199 and 11999.

In the image processing case corresponding to processing in which the recording image is rotated 90°, the set values of the respective registers are set to predetermined values and the writing operation of the image data is similarly performed. FIG. 9 shows a case in which a storing state of the image data DATA in the page memory 2 corresponds to paper size A3. Items (a), (b), (c) and (d) in FIG. 9 respectively show processing states of the recording image in which the recording image is rotated 0°, −90°, +90° and 180°.

Figure 10:
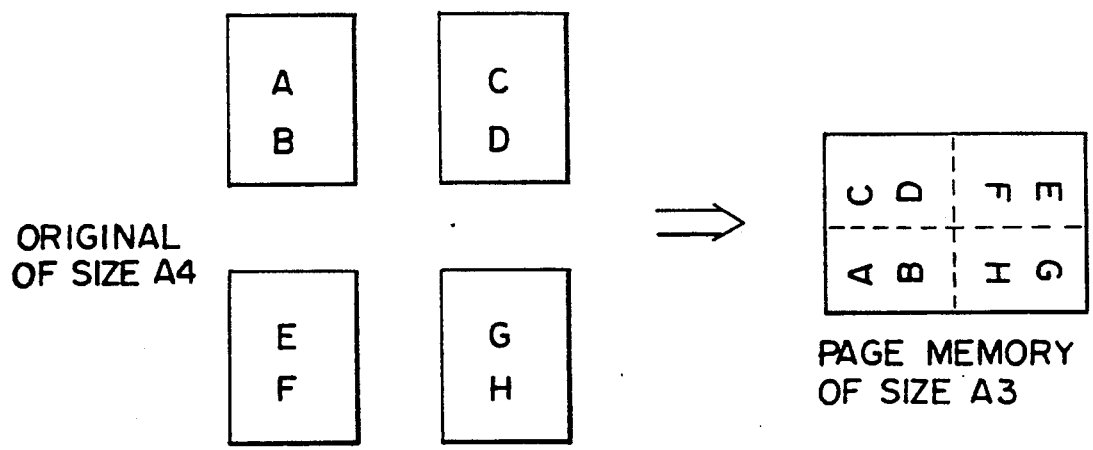
FIG. 10 is an explanatory view showing a state in which images on four sheets of an original having paper size A4 are stored to the page memory by using a size-reduction mode.

In FIG. 10, a size-reduction mode is used to reduce the size of four sheets of the original having paper size A4 by 71% so as to provide recording images having paper size A5. Further, the recording images are rotated ±90° and are stored to the page memory 2. If these image data DATA are read out of the page memory and are outputted to a printer, it is possible to obtain a copy in which the paper sheets can be folded twice and formed in an opening state.

Figure 11:
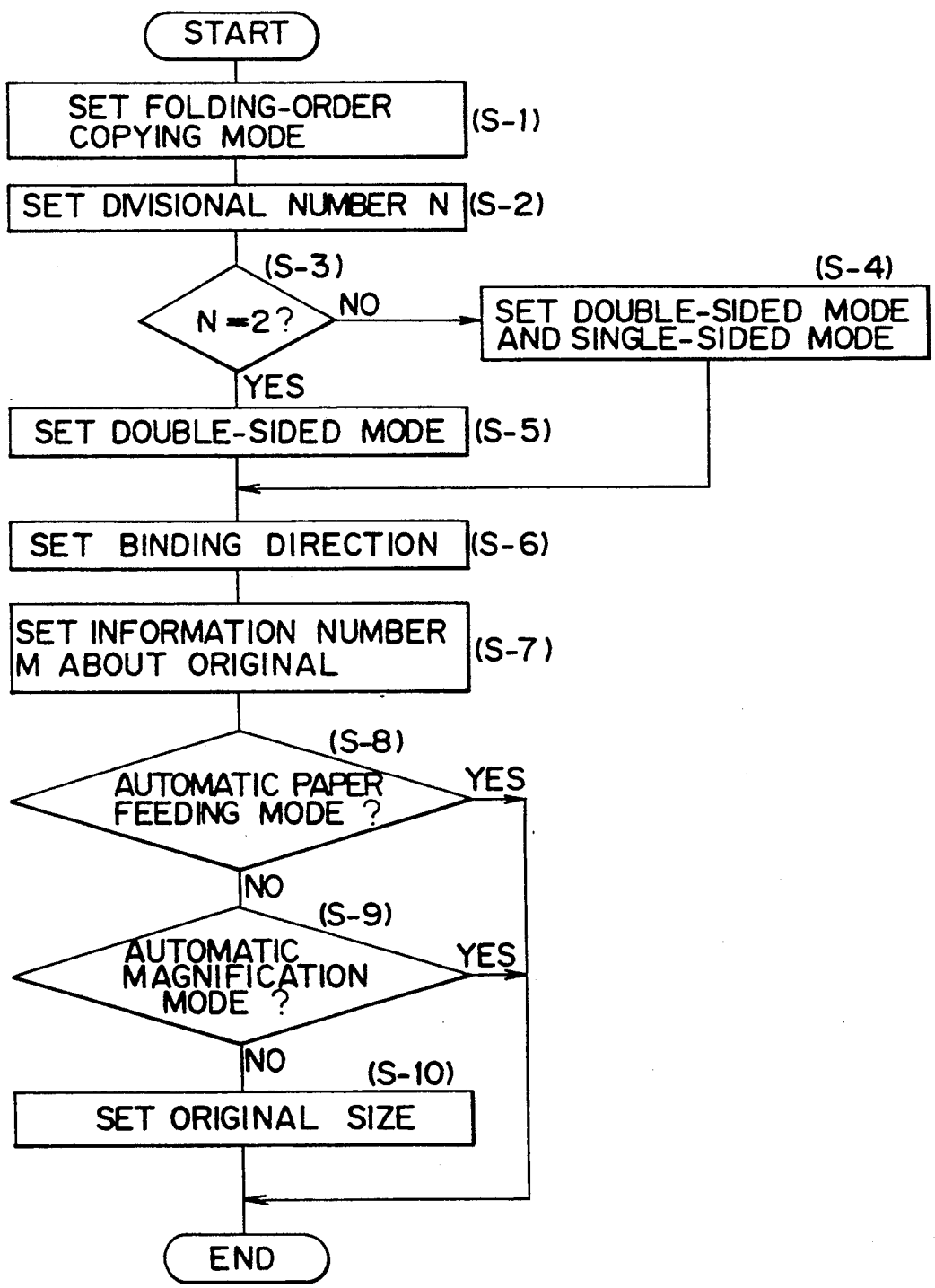
FIG. 11 is a flow chart of operating control of the copying machine in a folding-order copying mode.

FIG. 11 is a flow chart of operating control in a folding-order copying mode. A copying operation of the copying machine in the folding-order copying mode will next be described with reference to FIG. 11.

When a user first pushes a button for the folding-order copying mode in the operating section, an operation panel displays a message as to how many sections an image of the original is divided into (in a step S-1). In a step S-2, the user inputs a divisional number N by using ten keys. Only a specific number of $2^n$ can be inputted as the divisional number N where n is an integer. When a number except for $2^n$ is inputted, an alarm sound is generated and a minimum number of $2^n$ greater than the inputted number is selected. Further, the operation panel displays a message as to whether $2^n$ divisions are suitable or not. The user can confirm this message. In a step S-3, it is judged whether the divisional number N is equal to 2 or not. When the divisional number N is equal to 2, a double-sided copying mode is set in a step S-5. In contrast to this, when no divisional number N is equal to 2, the operation panel displays a message about selection of the double-sided copying mode or a single-sided copying mode. The user selects and sets the double-sided copying mode or the single-sided copying mode by a setting key in a step S-4. After the double-sided copying mode or the single-sided copying mode is completely selected, a longitudinal or transversal binding direction is inputted in a step S-6.

The operation panel next displays a message about the number of image (character) information units constituting one sheet of the original. This message shows an information number M about the original. In a step S-7, the user sets the information number M about the original by operating the ten keys. When the inputted information number M about the original is equal to 2, an operating state of the copying machine is equal to a state in which an opening original key is pushed down. In this case, the operation panel displays a message about confirmation of this state. Next, it is judged in steps S-8 and S-9 whether or not the user sets an automatic paper size mode or an automatic magnification mode in advance. If these modes are not set, the operation panel displays a message about an input of the original size. In a step S-10, the user sets the original size by operating an original size key.

In the following description, the divisional number N, the information number M and the original size are respectively set to 2, 1 and A4 in a concrete example of the folding-order copying operation. Further, the size of a sheet of transfer paper is set to A4.

Figure 12A:
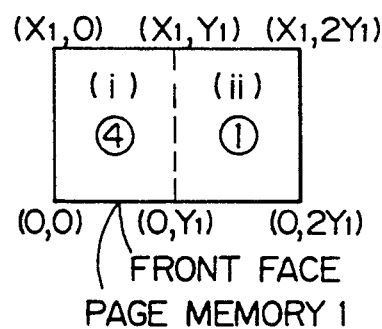
FIGS. 12a and 12b are explanatory views each showing a memory state of image data on four pages of the original stored to an image memory.
Figure 12B:
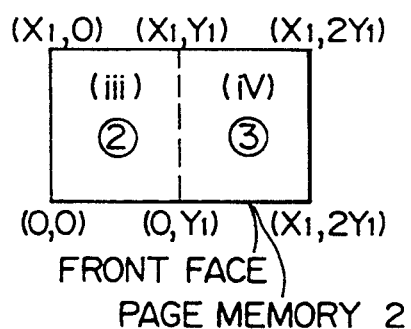

FIGS. 12a and 12b show memory states of image data ① to ④ on four pages of the original stored to the image memory 2 constructed by page memories 1 and 2. FIGS. 12a and 12b show these memory states of the image data every page memory. The page memories 1 and 2 respectively correspond to front and rear faces of the paper sheet.

When the automatic document feeder (ADF) is used, a printing button is pushed down and the scanner scans an original face to read image information on first to fourth sheets of the original. Image processings such as various kinds of correction processings, a main-scanning zooming operation, a gamma ($\gamma$) transformation, etc. are performed with respect to an image signal of the read image information. Thereafter, the processed image signal is converted to a laser writing signal. In this embodiment, the number of bits constituting the laser writing signal is set to one. However, for example, the laser writing signal may be constructed by four bits (represented by 16 values) or eight bits (represented by 256 bits). The laser writing signal is stored to a predetermined region of the image memory 2 into which two original information of size A3 can be stored. In this case, size information of the original and the transfer paper are already inputted to the image memory. Accordingly, image data read out of the original having size A4 are compressed from size A4 to size A5. Namely, the image data are reduced by 71% in size and are stored to the image memory 2.

In this embodiment, the data of recording images copied on front and rear faces of the sheet of transfer paper are respectively stored to the page memories 1 and 2. Namely, image data ① on the first page of the original are sequentially stored to the page memory 1 from a position $(0, Y_1+1)$ in a region (ii) of paper size A5 every row address. Image data ② on the second page of the original are sequentially stored to the page memory 2 from a position (0, 0) in a region (iii) of paper size A5 every row address. Image data ③ on the third page of the original are sequentially stored to the page memory 2 from a position (0, $Y_{1+}1$) in a region (iv) of paper size A5 every row address. Image data ④ on the fourth page of the original are sequentially stored to the page memory 1 position (0, 0) in a region (i) of paper size A5 every row address. When the reading operation of the original on the fourth page thereof is started, the image data begin to be read out of the memory 2 and a recording operation of the copying machine body I in the writing section thereof is started in accordance with the read image data. First, one copying process with respect to the rear face of the sheet of transfer paper is completed by using the image data ② and ③ read out of the page memory 2. Thereafter, the image data ④ and ① read out of the page memory 1 are recorded onto the front face of the sheet of transfer paper reversed and fed again in a front-face image recording order. Further, a conveying operation of the next sheet of the original is started by the automatic document feeder (ADF).

When sheets of the original are manually fed, a user arranges the sheets of the original one by one on the contact glass 39 and image information of the original on the first to fourth pages thereof are read by scanning the original by the scanner. These image information are stored to the page memory 2 in a predetermined region thereof. At the using time of the automatic document feeder (ADF), a print starting button for reading image information of the original on the fourth page thereof is similarly pushed down. At this time, the recording operation of the copying machine body I in the writing section thereof is started. Information for completing the reading operation of the original is inputted by pushing a clearing key down.

Figure 13A:
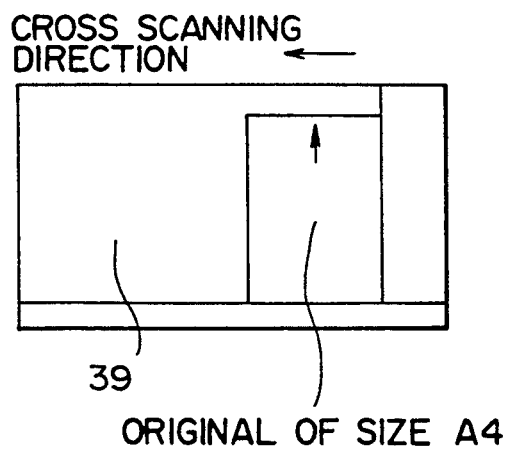
FIGS. 13a and 13b are explanatory views showing an arranging direction of the original on a contact glass.
Figure 13B:
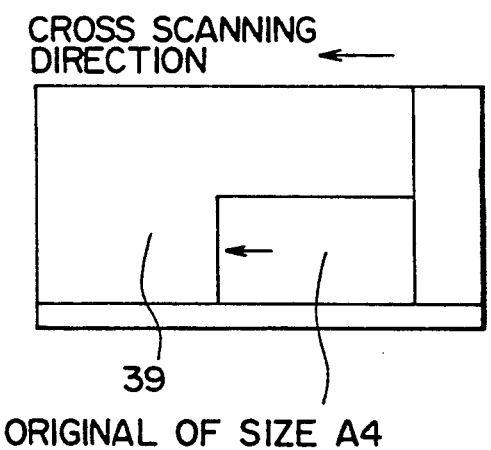

FIGS. 13a and 13b show arranging directions of the original on the contact glass 39. FIG. 13a shows a case in which the original is arranged such that a longer side of the original is parallel to a main scanning direction. This arranging direction is called a transversal direction in the following description. FIG. 13b shows a case in which the original is arranged such that a longer side of the original is parallel to a cross scanning direction. This arranging direction is called a longitudinal direction in the following description. In the following description, the original is arranged on the contact glass in the transversal direction as shown in FIG. 13a unless there is a special description about the arranging direction of the original.

FIGS. 14 and 15 are respectively timing charts showing various kinds of operations of the constructional sections and reading and writing signals inputted to the page memory 2 when the above automatic document feeder (ADF) is used and the original is manually fed.

Next, the divisional number N, the information number M and the original size are respectively set to 4, 1 and A4 and the double-sized copying mode is set. In the following description, size A3 of the transfer paper is used and images of the original of size A4 on eight pages (or more than eight pages) are copied onto both sides of sheets of transfer paper having size A3 by dividing each of these sheets into four sections.

Figure 16A:
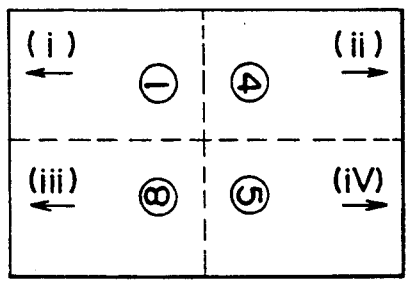
FIGS. 16a and 16b are explanatory views each showing a memory state of data stored to the image memory.
Figure 16B:
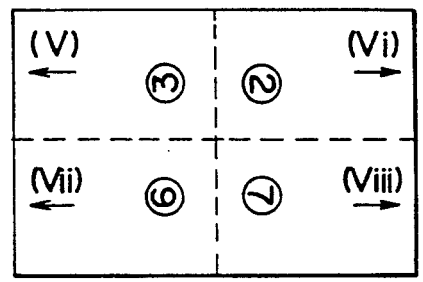
Figure 17A:
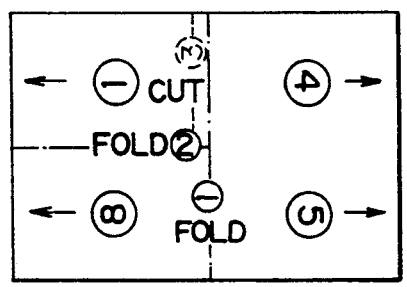
FIGS. 17a and 17b are explanatory views showing the patterns of a folding line and a cutting line outputted on a sheet of transfer paper.
Figure 17B:
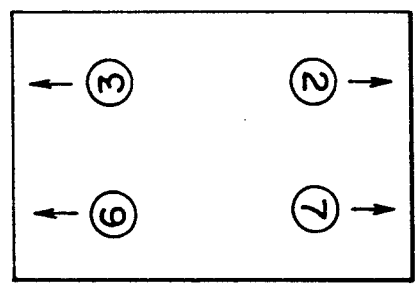
Figure 18A:
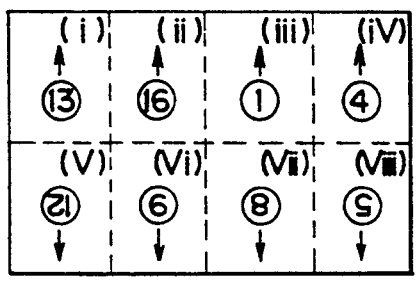
FIGS. 18a and 18b are explanatory views showing memory states of data stored to the image memory in the case of an eight-divisional copy.
Figure 18B:
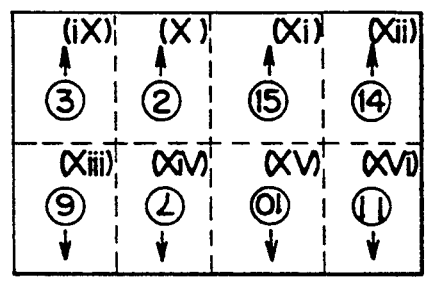

FIGS. 16a and 16b show cases in which memory states of image data stored to the image memory correspond to the sheets of transfer paper having size A3. FIGS. 17a and 17b show patterns of folding and cutting lines outputted onto the sheets of transfer paper together with images every page. Each of FIGS. 16a and 17a corresponds to a recording image on the front face of a transfer paper sheet. Each of FIGS. 16b and 17b corresponds to a recording image on the rear face of a recording paper sheet. In these figures, an arrow shows an upward direction of an image. The figures subsequent to FIGS. 16 and 17 also show that an arrow shows an upward direction of an image.

First, the folding-order copying mode, the double-sided copying mode and a four-divisional copying mode are set by pushing keys therefor down on the operation panel. Further, a size-reduction copying mode at a zoom ratio of 71% from size A4 to size A5 is selected to reduce the original image having size A4 to a copied image having size A5. Next, sheets of transfer paper having size A3 are stored into a paper feeding cassette and the original is arranged on the contact glass 39 or an original base of the automatic document feeder (ADF). The original size may be automatically detected by using an original size detecting mechanism such as a prescanning mechanism. Further, if a mechanism for reversing a sheet of the original is disposed in the automatic document feeder (ADF), it is possible to make a copy in a page order by using the automatic document feeder even in the case of a double-sided original.

When the original is arranged in the transversal direction as shown in FIG. 13a, recording images on first, third, sixth and eighth pages of the original are rotated 90° leftward in FIGS. 16a and 16b, and recording images on second, fourth, fifth and seventh pages of the original are rotated 90° rightward in FIGS. 16a and 16b. In contrast to this, when the original is arranged in the longitudinal direction as shown in FIG. 13b, no recording images on the first, third, sixth and eighth pages of the original are rotated in FIGS. 16a and 16b, and the recording images on the second, fourth, fifth and seventh pages of the original are rotated 180° rightward in FIGS. 16a and 16b. These image rotational processings can be also performed when the image data are read out of the image memory.

First, a sheet of the original on the first page is arranged on the contact glass 39 and a copy starting button is pushed. Thus, the scanner scans an original face to read an original image. Image data are converted to a laser writing signal and the original image is rotated 90° and is reduced in size in the main scanning direction, etc. Image data ① of the original on the first page thereof are stored to the image memory in a corresponding portion (i) thereof shown in FIG. 16a. The image memory has a memory capacity corresponding to two sheets of paper having size A3 as a maximum reading size.

When the image data of the original on the first page thereof are completely stored to the image memory, a sheet of the original on a second page thereof is arranged on the contact glass in accordance with a message about setting of the original on the second page thereof. Then, the print starting button is pushed down. Image data ② of the original on the second page thereof are read by the scanning operation of the original and are compressed and an original image on the second page is rotated 90° rightward. These image data are then stored to the image memory in a corresponding portion (vi) thereof shown in FIG. 16b. The above-mentioned operations are repeatedly performed in accordance with procedures shown in FIGS. 16a and 16b until the scanning operation of the original on the third to eighth pages thereof.

An image recording operation is started when image data of the original on the eighth page thereof are completely stored to the image memory in a corresponding portion thereof, or when there is no original to be read during the reading operation. In this case, a front face image is first recorded as shown in FIG. 16a. Subsequently, a rear face image is recorded as shown in FIG. 16b. In the image recording operation, the copying machine combines and outputs pre-registered patterns of folding lines (folds ① and ②) shown by one-dotted chain lines and a cutting line 3 shown by a broken line in FIG. 17a.

The paper sheets are folded in a folding order of folds ① and ② shown in FIG. 17a such that these folds form top portions of the sheets. Finally, a marginal portion is cut along the fold ③ so that a copy formed in folding and overlapping shapes can be obtained.

The original of size B5 on 16 pages thereof is copied onto both sides of sheets of transfer paper having size A3 by dividing each of these sheets into eight sections as follows.

Figure 19:
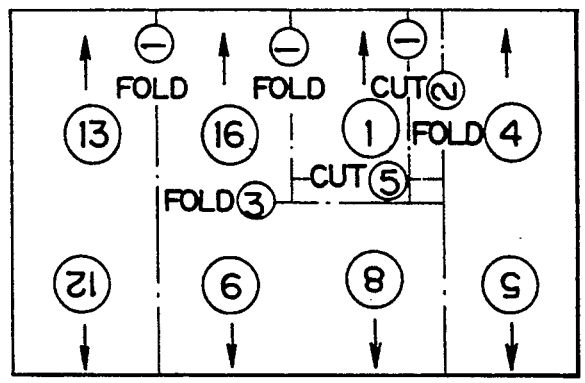
FIG. 19 is an explanatory view showing the patterns of folding and cutting lines outputted on a sheet of transfer paper in the case of the eight-divisional copy.

Similar to FIGS. 16a and 16b, FIGS. 18a and 18b show memory states of image data stored to the image memory and corresponding to sheets of transfer paper having size A3 in the case of this eight-divisional copy. FIG. 19 shows patterns of folding and cutting lines outputted onto sheets of transfer paper together with images every page.

The folding-order copying mode, the double-sided copying mode and an eight-divisional copying mode are set by pushing keys therefor down on the operation panel. Thereafter, the scanning operation and the size-reducing operation are performed at a zoom ratio of 50% (from A4 to A6) and images are rotated 0° or 180°. The other operations are similar to those in the case of the four-divisional copy mentioned above. Accordingly, an explanation about the subsequent operations are omitted in the following description. Each of FIGS. 16 to 19 shows one example of the patterns of page arrangements, folding lines and cutting lines. Therefore, it is possible to use another page arrangement and pattern.

When no information number M is equal to one, the original is constructed by a plurality of image information units. In this case, for example, an image of the original is copied onto both sides of sheets of transfer paper by dividing each of these sheets as follows.

Figure 25A:
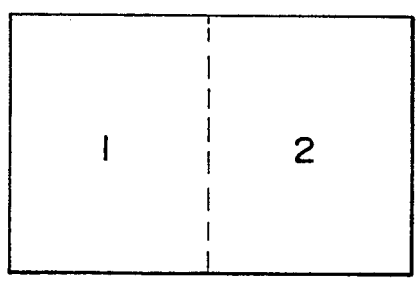
FIGS. 25a to 25c are explanatory views showing examples in which the image of an original is constructed by a plurality of image information units.
Figure 25B:
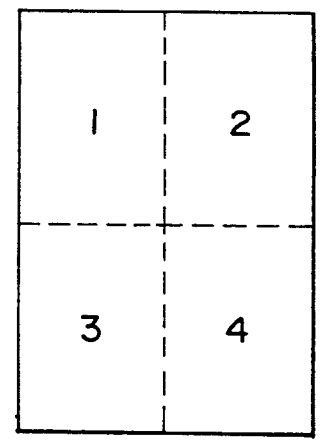
Figure 25C:
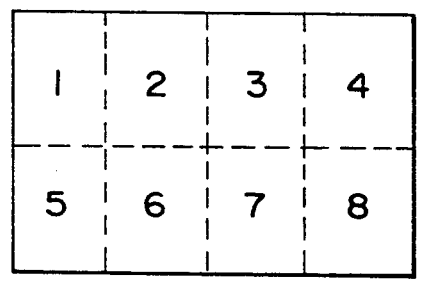

FIGS. 25a, 25b and 25c show examples in which the original having size A4 is constructed by plural image information units (in the case of information number M). FIGS. 25a, 25b and 25c respectively show cases in which the information number M is equal to 2, 4 and 8. In these figures, respective information about the original are shown by continuous numbers. In the case of M=2, an opening bookbinding original of size A5 on one page thereof is copied onto both sides of sheets of transfer paper having size A4 by dividing each of these sheets into two sections as follows.

Figure 20:
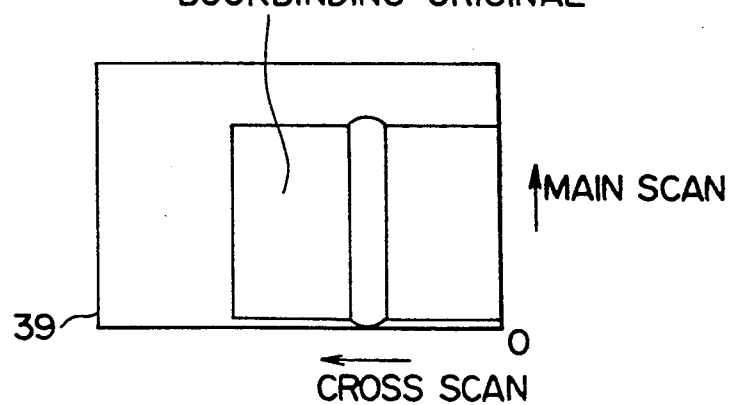
FIG. 20 is an explanatory view showing an arranging direction of the original spread or opened on the contact glass.
Figure 26:
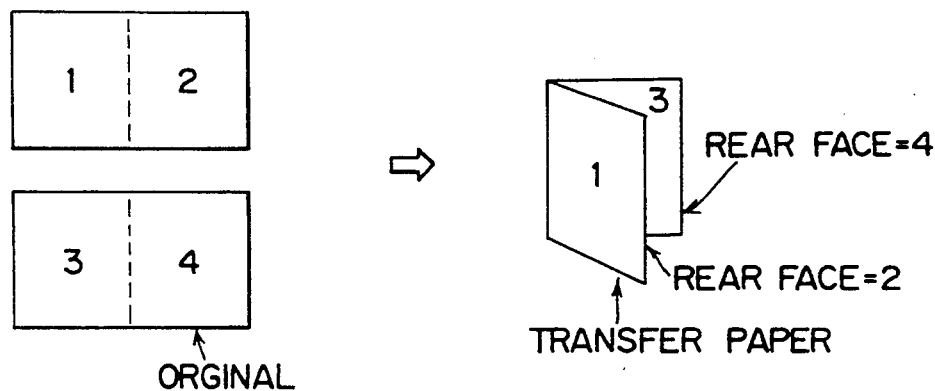
FIG. 26 is an explanatory view showing arranging states of the original and an image on a sheet of transfer paper in the case of two image information units.

FIG. 26 show arranging states of the image units of the original and the transfer paper in this case. FIG. 20 shows an arranging direction of the opening original on the contact glass 39. In FIG. 26, reference numerals 1 to 4 designate sequential image units of the original and the transfer paper.

In this case, image data on one sheet of the original are divided into two image data having size A5. Each of the divided image data is treated as if the two divided image data are respectively read out of two originals having size A5. Namely, image data ① of the original on a first page thereof read in a first scanning operation are sequentially stored to the page memory 1 from a position (0, $Y_1+1$) in a region (ii) of the page memory 1 having size A5 every row address. Further, image data ② of the original on a second page thereof read in the first scanning operation are sequentially stored to the page memory 2 from a position (0, 0) in a region (iii) of the page memory 2 having size A5 every row address. Further, image data ③ of the original on a third page thereof read in a second scanning operation are sequentially stored to the page memory 2 from a position (0, $Y_1+1$) in a region (iv) of the page memory 2 having size A5 every row address. Further, image data ④ of the original on a fourth page thereof read in the second scanning operation are sequentially stored to the page memory 1 from a position (0, 0) in a region (i) of the page memory 1 having size A5 every row address. Accordingly, the copying operation is similar to that in the above case except that the reading operation of the original is completed by performing two scanning operations of the scanner. In this case, ($X_1$, $Y_1$) designate address coordinates of final image data when a half of the page memory is filled with the image data.

When the image data on the first to fourth pages of the original are stored to the page memories 1 and 2, the page memories store marginal regions provided by white data and store data of folding and cutting lines respectively showing folds and cutting portions. These marginal regions and the data of folding and cutting lines are stored to the page memories on boundaries of the image units on the sheets of transfer paper. The data of folding and cutting lines are called folding line data in the following description. The marginal regions are disposed to prevent a missing portion from being caused in a recording image when a punch hole is formed on a folding side of the folded sheets of transfer paper. Further, the marginal regions are disposed to prevent shadows of original ends and dirty portions of a pressure plate as a background from being copied together with the recording image. Accordingly, when the folding-order copying mode is selected, memory regions of the image data are reduced in size by the above marginal regions and recording regions of the folding line data. For example, a two-folding copy is made in a double-sided recording operation by using sheets of transfer paper having size A4 from four sheets of the original having size A4 in which the information number M is equal to one. In this case, a reduction ratio of the recording image is set to 65% small than a reduction ratio of 71% set in a size-reduction mode from size A4 to size A5.

The image data are stored in the following storing method. Namely, the white data are first stored to the region (ii) of the page memory 1 having size A5 from a position (0, $Y_1+1$) to a position ($X_1$, $Y_1+\Delta Y$). Then, image data ① at the reduction ratio 65% are stored to this region (ii) of the page memory 1 from a position (0, $Y_1+\Delta Y+1$) to a position ($X_1$, $2Y_1$). Next, image data ② at the reduction ratio 65% are stored to the region (iii) of the page memory 2 having size A5 from a position (0, 0) to a position ($X_1$, $Y_1-\Delta Y$). Further, the white data are stored to this region (iii) of the page memory 2 from a position (0, $Y_1-\Delta Y+1$) to a position ($X_1$, $Y_1+\Delta Y$). Then, image data ③ at the reduction ratio 65% are stored to the region (iv) of the page memory 2 from a position (0, $Y_1+\Delta Y+1$) to a position ($X_1$, $2Y_1$). Further, image data ④ at the reduction ratio 65% are stored to the region (i) of the page memory 1 from a position (0, 0) to a position $(X_1, Y_1 - \Delta Y)$. Then, the white data are stored to this region (i) of the page memory 1 from a position $(0, Y_1 - \Delta Y + 1)$ to a position $(X_1, Y_1)$.

Figure 27A:
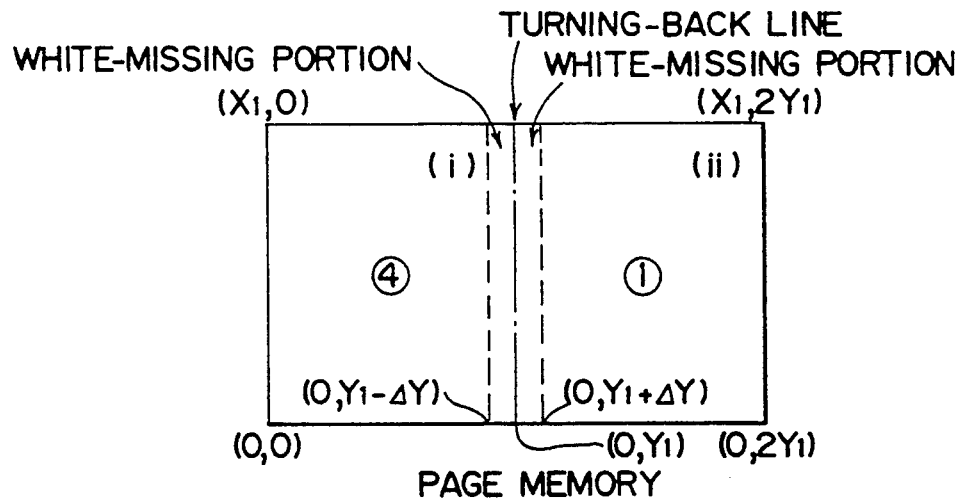
FIGS. 27a and 27b are explanatory views showing an image-data recording region, a marginal region and a folding-line data recording region of the page memory when the two-divisional copying mode is selected.
Figure 27B:
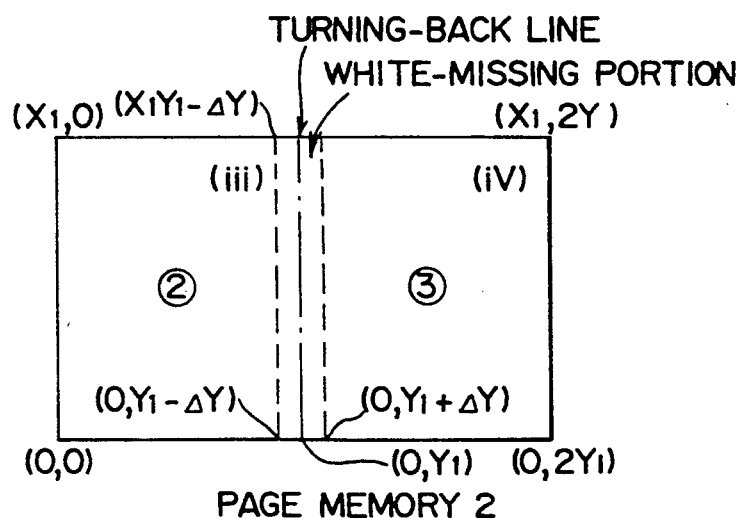
Figure 28:
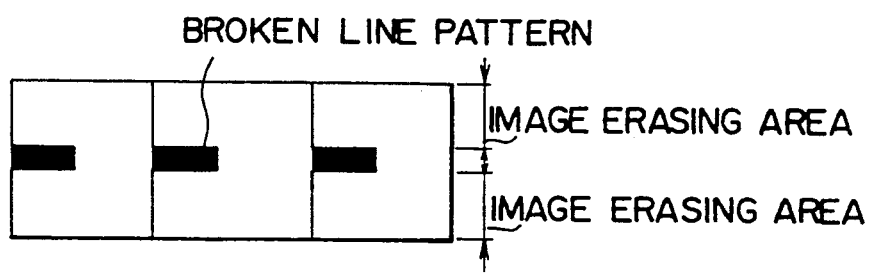
FIG. 28 is an enlarged explanatory view showing a broken line pattern and a marginal portion.

The respective pattern data of the folding line data are stored to a ROM. Pattern data corresponding to the recording region of the folding line data in a central marginal region are recorded to the ROM every folding-order copying mode. FIGS. 27a and 27b show the recording region of the image data, the marginal region and the recording region of the folding line data every page memory. In this embodiment, with respect to the folding line data, a cutting line, a bottom folding line and a top folding line are respectively shown by a broken line "......", a broken line "- - -" and a one-dotted chain line "— · —". Further, numeral data showing folding orders are inserted between folding line patterns. FIG. 28 is an enlarged view showing an example of patterns of a broken line and a marginal portion formed between image units. In FIG. 28, the entire broken line and marginal portions are formed by repeating a unit pattern constructed by a single broken line pattern and a marginal pattern.

The image data may be stored to the page memories 1 and 2 and may be read therefrom in another method. For example, the following method may be used. The image data ① and ② on the first and second pages of the original are sequentially stored to the page memory 1 from the position (0, 0) in the region (i) of the page memory 1 having size A5 to the position $(X_1, 2Y_1)$ in the region (ii) of the page memory 1 every row address. The image data ③ and ④ on the third and fourth pages of the original are sequentially stored to the page memory 2 from the position (0, 0) in the region (iii) of the page memory 2 having size A5 to the position $(X_1, 2Y_1)$ in the region (iv) of the page memory 2 every row address. Thereafter, the image data are read out of the page memory 1 from the position $(0, Y_1 + \Delta Y + 1)$ in the region (ii) of the page memory 1 having size A5 to the position $(X_1, 2Y_1)$ in this region (ii). Then, the image data are sequentially read out of the page memory 2 from the position (0, 0) in the region (iii) of the page memory 2 to the position $(X_1, Y_1 - \Delta Y)$ in this region (iii). The image data ② and ③ on the second and third pages of the original are then recorded onto the rear face of a sheet of transfer paper. Further, the image data are read out of the page memory 2 from the position $(0, Y_1 + \Delta Y + 1)$ in the region (iv) of the page memory 2 to the position $(X_1, 2Y_1)$ in this region (iv). Then, the image data are sequentially read out of the page memory 1 from the position (0, 0) in the region (i) of the page memory 1 to the position $(X_1, Y_1 + \Delta Y)$. The image data ④ and ① on the fourth and first pages of the original are recorded onto a front face of the sheet of transfer paper reversed and conveyed.

An opening original (binding original) of size B5 on one page thereof is copied onto both sides of a sheet of transfer paper having size A4 by dividing this sheet into four sections as follows.

Figure 29A:
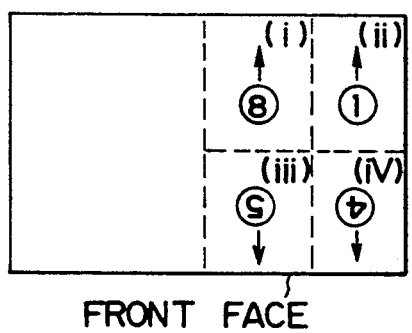
FIGS. 29a and 29b are explanatory views showing memory states of data stored to the image memory.
Figure 29B:
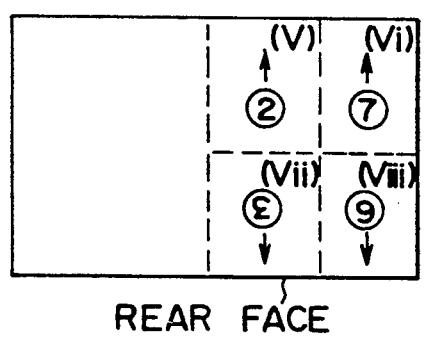

FIGS. 29a and 29b show memory states of image data stored to the image memory and corresponding to a sheet of transfer paper having size A3.

The folding-order copying mode, the double-sided copying mode, the four-divisional copying mode, an opening-original copying mode and an original-replacing copying mode are set by pushing keys therefor down on the operation panel. Subsequent copying operations are similar to those in the case of one sheet of the original. In this case, the image data on two pages of the original are read out of the image memory at one time. Namely, when a half of the opening original is completely scanned by the scanner, a page-changing signal is transmitted to a memory control section and completion of the reading operation of the original on a first page thereof is detected. A front half of the image data read by the scanner in the cross scanning direction is stored to the image memory as odd preceding pages. A rear half of the image data read by the scanner in the cross scanning direction is stored to the image memory as even subsequent pages. An image is not rotated on the first, second, seventh and eighth pages of the original, but is rotated 180° on the third, fourth, fifth and sixth pages of the original.

When the image recorded onto the sheet of transfer paper is in conformity with that in an opening state of the opening original, a page aligning key is pushed down on the operation panel and complete white data are written to a region (ii) of the image memory shown in FIG. 29a. Then, the image data on the first and subsequent pages of the opening original are stored to the image memory by shifting the image data from each other every one page. Similar operations are performed in the case of an eight-divisional copy.

A copying operation of the copying machine in the folding-order copying mode will next be described in accordance with flow charts shown in FIGS. 33 to 36. When a button for the folding-order copying mode is pushed down, the folding-order copying mode is set in a step S-11. Then, ten keys are operated to set the divisional number N in a step S-12. When a print starting button is pushed down in a step S-13, a counting value i of a counter for counting the number of sheets is set to zero in a step S-14. The counting value i of the number of sheets shows an order of N-divisional page memories. This counting value i is increased by one in a step S-16 when the original is fed by the automatic document feeder (ADF) in a step S-15. An original size sensor is additionally disposed in the automatic document feeder (ADF) and measures longitudinal and transversal sizes of the original in a step S-17 when the original is fed.

Figure 34:
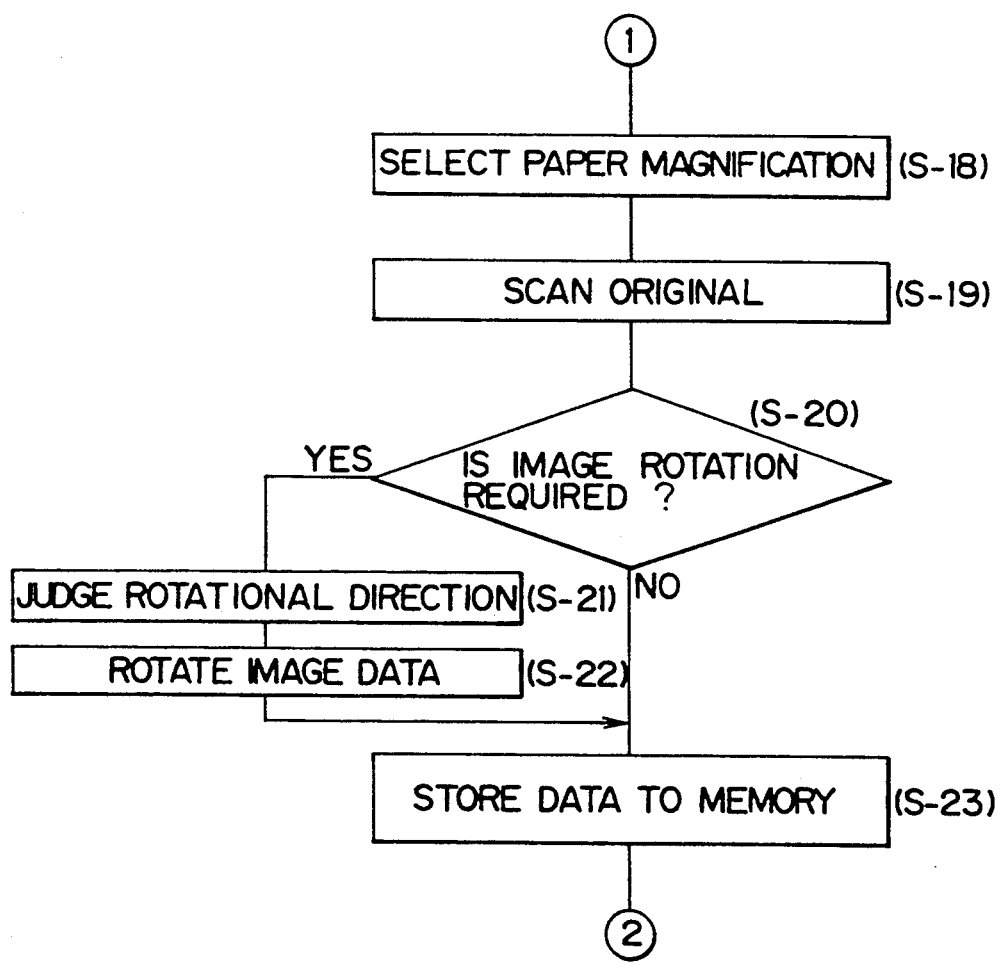
FIG. 34 is a flow chart of a control operation of the copying machine subsequent to the control operation shown in FIG. 33 when the folding-order copying mode is selected.

Next, as shown in FIG. 34, a subroutine for selecting a paper magnification is executed in a step S-18. In a step S-19, the original is scanned by the scanner. In the next step S-20, it is judged whether the rotational processing of image data is required or not. The requirement of the rotational processing of the image data is determined by a setting direction of the original, a setting direction of a sheet of transfer paper, a setting mode, the divisional number N and the sheet-number counting value i. For example, when the original is scanned by the scanner in the longitudinal direction and the divisional number N is equal to 4, it is necessary to rotate image data on the first page of the original by 180°. When the original is scanned by the scanner in the longitudinal direction and the divisional number N is equal to 8, it is necessary to rotate image data on the first page of the original rightward by 90°. The setting direction of the original is simultaneously judged when the original size is detected in a step S-17. A rotational direction of the image data is judged in a step S-21 if the rotational processing of the image data is required. The image data are then rotated in a step S-22. Thereafter, the rotated image data are stored to a predetermined region of the page memories in a step S-23.

Figure 35:
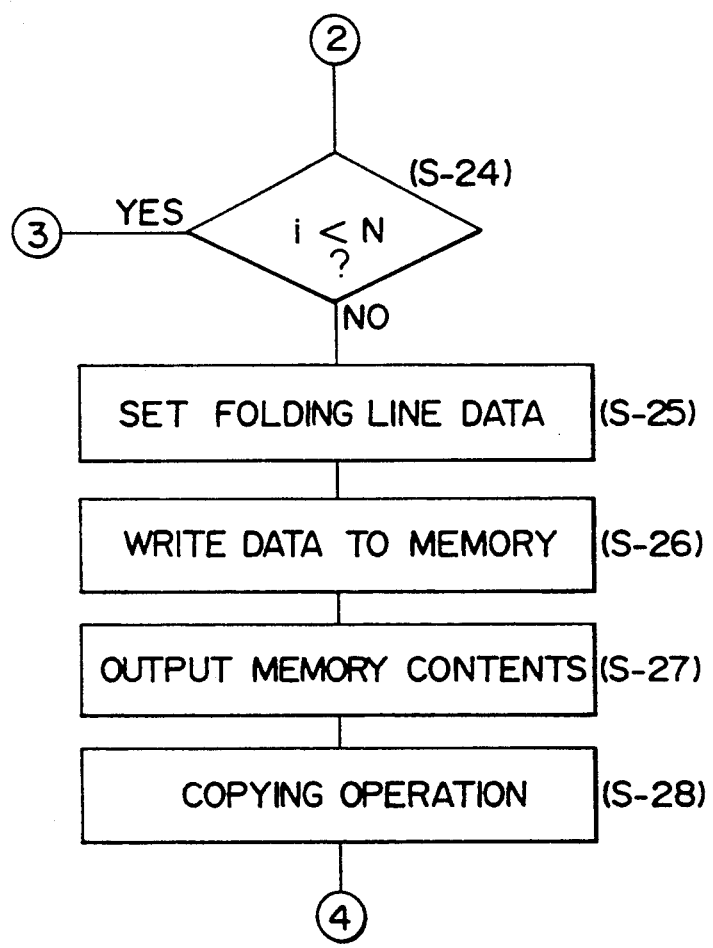
FIG. 35 is a flow chart of a control operation of the copying machine subsequent to the control operation shown in FIG. 34 when the folding-order copying mode is selected.

Next, as shown in FIG. 35, it is judged in a step S-24 whether the sheet-number counting value i is smaller than the divisional number N or not. When this judgment is YES, it is returned to the step S-15. In contrast to this, when this judgment is NO, folding line data and white data are set in a step S-25 and are stored to the page memories in a boundary region of an image unit in a step S-26. The image data, the folding line data and the white data stored to the page memories are outputted therefrom in a step S-27. Then, a normal copying operation is executed in accordance with these outputted data in a step S-28. When the step S-28 is completely executed, it is returned to the step S-14.

Figure 33:
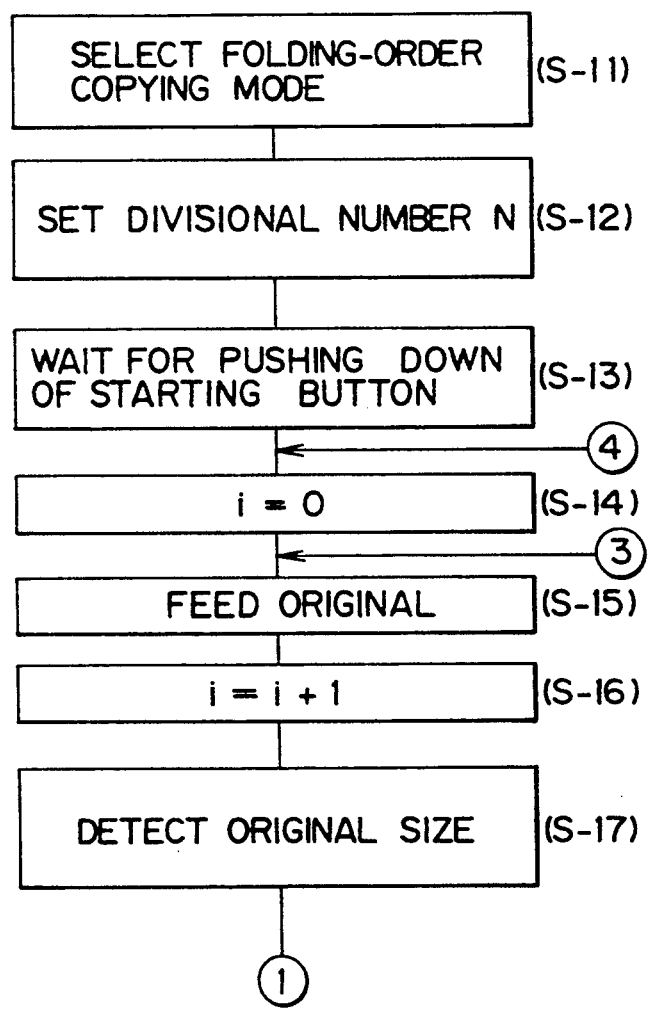
FIG. 33 is a flow chart of a control operation of the copying machine when an automatic document feeder (ADF) is used and the folding-order copying mode is selected.
Figure 36:
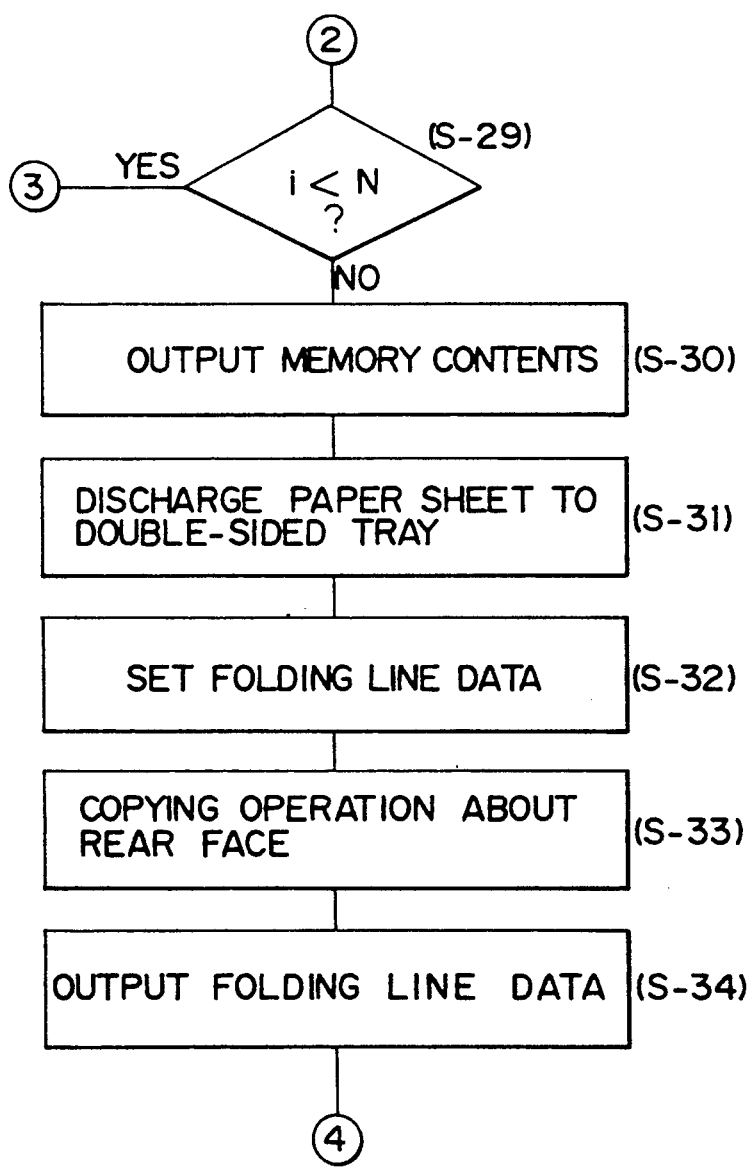
FIG. 36 is a flow chart of a control operation of the copying machine subsequent to the control operation shown in FIG. 34 when the folding-order copying mode and the double-sided copying mode are selected.

A copying operation of the copying machine in the double-sided copying mode is executed in accordance with the flow charts shown in FIGS. 33, 34 and 36. In the following description, only the flow chart shown in FIG. 36 will be briefly explained since the flow charts shown in FIGS. 33 and 34 are commonly used and already explained. It is judged in a step S-29 whether the sheet-number counting value i is smaller than the divisional number N or not. When this judgment is YES, it is returned to the step S-15. In contrast to this, when this judgment is NO, the image data stored to the page memories are outputted to a printer in a step S-30, thereby executing the normal copying operation. A sheet of transfer paper having a printed original image thereon is discharged to a double-sided tray in a step S-31. Next, folding line data and white data are set in a step S-32. A copying operation of the copying machine with respect to a rear face of the paper sheet is then started in a step S-33 and the folding line data are outputted from the page memories in a step S-34. In this case, a folding line pattern is printed on the rear face of the sheet of transfer paper having the printed original image on the front face thereof. Accordingly, when a copy is made in the shape of a bag by folding the printed sheet of transfer paper, no folding line pattern is exposed along folds on the front face of the sheet of transfer paper so that the obtained copy having the bag shape has an excellent appearance.

Figure 38:
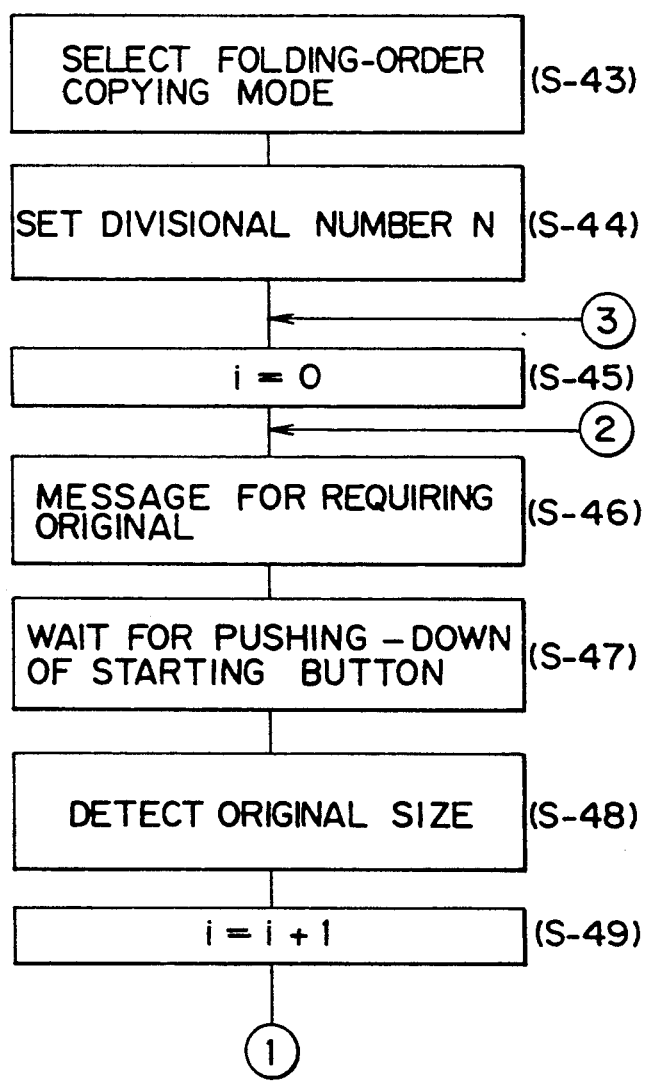
FIG. 38 is a flow chart of a control operation of the copying machine when the folding-order copying mode and an original-replacing copying mode are selected.

When the original-replacing copying mode is selected to sequentially feed the original manually, the copying operation of the copying machine is controlled in accordance with a flow chart shown in FIG. 38. In FIG. 38, a button for the folding-order copying mode is pushed down in a step S-43. Thereafter, when ten keys are operated to set the divisional number N in a step S-44, the sheet-number counting value i is set to zero in a step S-45. As mentioned above, the sheet-number counting value i shows an outputting order of the image data stored to N-divisional page memories. This counting value i is increased one by one every time the original is supplied to the copying machine. Next, a message for setting the original in the operating section is displayed in a step S-46. When the print starting button is then pushed down in a step S-47, the original size sensor additionally disposed in the scanner measures longitudinal and transversal sizes of the original in a step S-48 when the original is scanned by the scanner. Further, the sheet-number counting value i is increased by one in a step S-49. The subsequent operations of the copying machine are performed in accordance with the above flow charts shown in FIGS. 34, 35 and 36.

Figure 37:
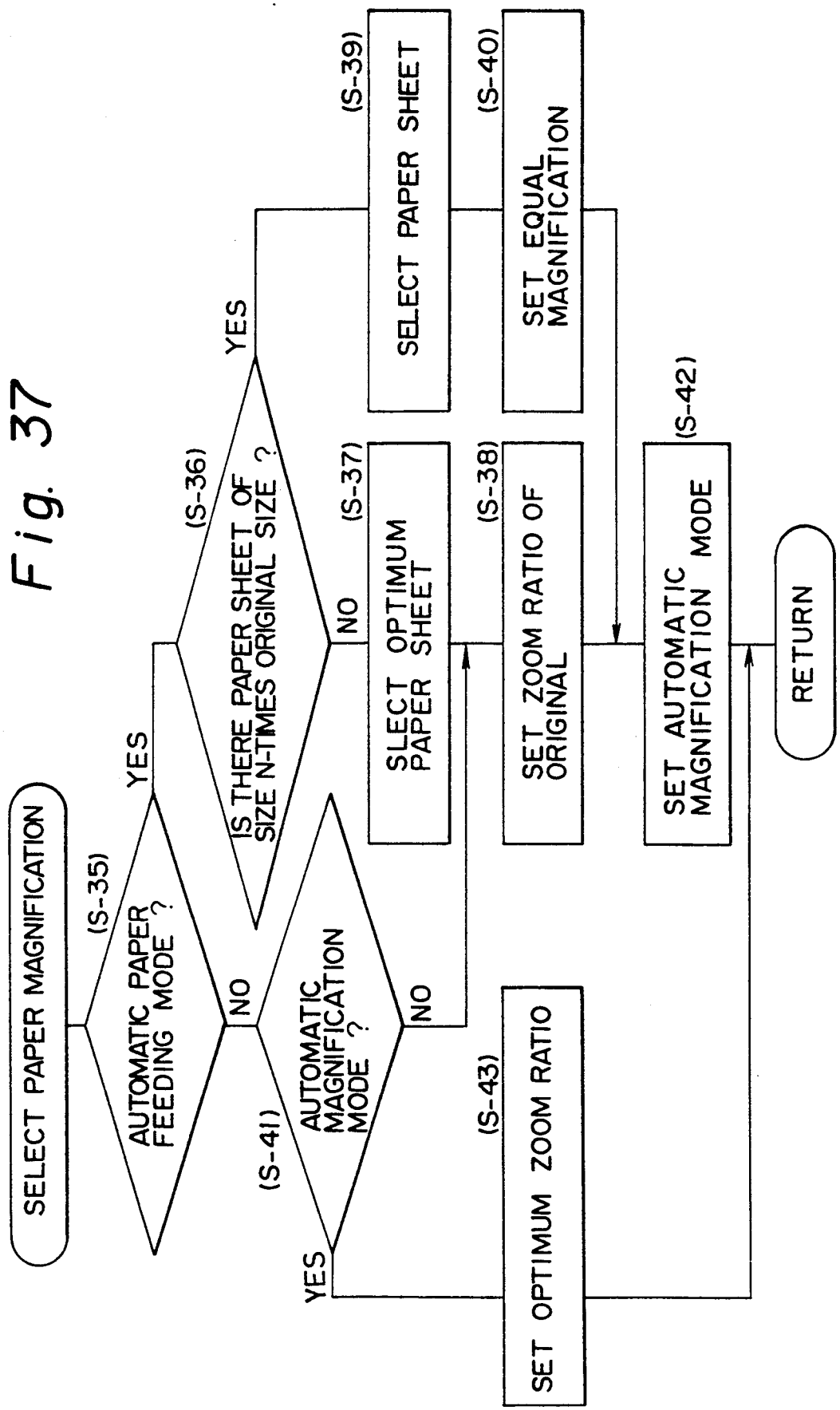
FIG. 37 is a flow chart of a subroutine for selecting a paper magnification.

The subroutine for selecting a paper magnification is set in the step S-18 in the flow chart shown in FIG. 34 and an operation of this subroutine will next be explained in accordance with a flow chart shown in FIG. 37.

In this embodiment, the copying machine has on automatic paper selecting (APS) function for automatically selecting a sheet of transfer paper required in accordance with a size of the original. The copying machine further has an automatic magnification selecting (AMS) function for automatically selecting the zoom ratio of a recording image when the sizes of the original and the sheet of transfer paper are set. In a step S-35, it is judged whether an operating mode of the copying machine is an automatic paper selecting (APS) mode or not. When this judgment is YES, it is judged in a step S-36 whether the sheet of transfer paper having a size N-times the original size is set or not since the original is read at an equal magnification in the folding-order copying mode. When this judgment is YES, the sheet of transfer paper having a size N-times the original size is selected as a transfer paper sheet in a step S-39. The zoom ratio is set to the equal magnification in a step S-40.

If no sheet of transfer paper having a size N-times the original size is set, an optimum sheet for the copying operation of the read original in the set mode is selected in a step S-37. This optimum sheet is a sheet having an area closest to that N-times an area of the original. The zoom ratio suitable for the original size is then set in a step S-38. If the size of the sheet of transfer paper is once selected, an operating mode of the copying machine is compulsorily set to an automatic magnification selecting (AMS) mode in a step S-42 so as to fixedly use this paper size. This setting operation is preferable when originals having different sizes are mixed with each other.

When no APS mode is set, it is judged in a step S-41 whether the AMS mode is set or not. When this judgment is YES, the zoom ratio for zooming the original size to a size 1/N times the size of the selected sheet of transfer paper is set as an optimum zoom ratio in a step S-43. In contrast to this, when this judgment is NO, it is returned to the step S-38 and zoom ratio of 1/N times suitable for the original size is set. When the zoom ratio in the copying operation and the size of the sheet of transfer paper are determined, the operating mode of the copying machine is compulsorily set to the AMS mode in a step S-42.

A folding-order image forming apparatus in accordance with a second embodiment of the present invention will next be described. In this embodiment, image data read by a scanner are once written to memory regions corresponding to the front and rear faces of a recording image as they are. The written image data are moved and rotated by image processings. To do this, the image forming apparatus constructed by e.g., a copying machine has two image memories of size A3 and another image memory for image processings having the same size A3.

In this second embodiment, for example, an original is divided into plural equal regions on one page thereof as in a Japanese laid-open patent publication and a folding-order copy of this original will next be explained.

Figure 30A:
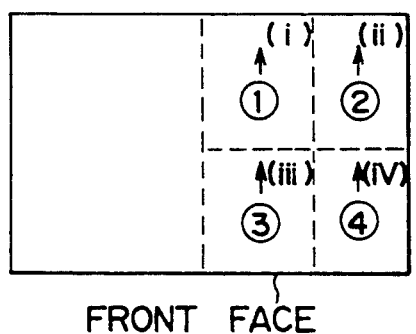
FIGS. 30a and 30b are explanatory views showing storing states of image data in an image memory when a second sheet of the original is read in the case of four image information units at selecting time of a four-divisional copying mode in a copying machine in accordance with a second embodiment of the present invention.
Figure 30B:
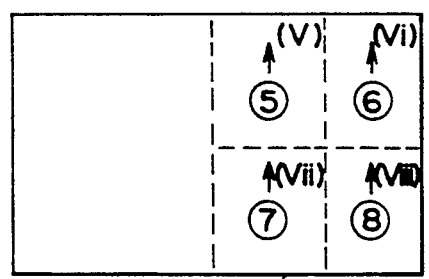
Figure 31A:
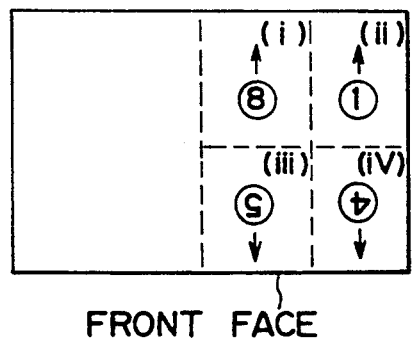
FIGS. 31a and 31b are explanatory views showing storing states of the image data in the image memory after images are rotated and rearranged in the case of the four image information units at the selecting time of the four-divisional copying mode in the copying machine in the second embodiment of the present invention.
Figure 31B:
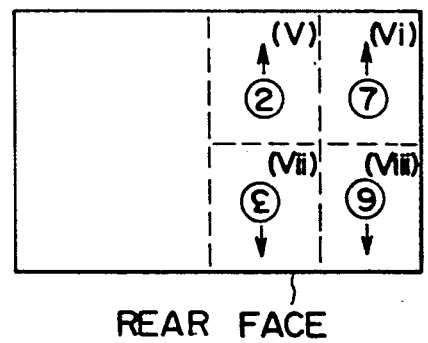

The original divided into four sections is copied at an equal magnification as follows when the information number M is equal to 4 as shown in FIG. 25b. FIGS. 30a and 30b show storing states of divisional image data stored to the image memory 2 when a second sheet of the four-divisional original is read. FIGS. 31a and 31b show storing states of divisional image data stored to the image memory 2 after the divisional image data are rotated and moved. In this case, the setting direction of a sheet of transfer paper is selected and set to a transversal direction.

First, a folding-order copying mode, a double-sided copying mode, a four-divisional copying mode and a moving copying mode are set by pushing keys therefor down on the operation panel. A first sheet of the original is arranged on the contact glass 39 and a print starting button is pushed down. Image data ① to ④ on the first sheet of the original are read by a scanning operation of the scanner and are stored to a front face region of an image memory as they are. A second sheet of the original is similarly read by the scanning operation and image data ⑤ to ⑧ on this second sheet are stored to a rear face region of the image memory as they are.

Next, the image data stored to the image memory are moved and rotated. Namely, the image data stored to the front face region are moved to an escaping region of the image memory as they are so as to form a space in the front face region. Next, the image data stored to the rear face region and the escaping region are divided every divisional page and are moved and rotated so as to form a predetermined folding-order recording image. Namely, the image data on first, fourth, fifth and eighth divisional pages of the original stored to the rear face region and the escaping region of the image memory are moved to the front face region. The image data on the fourth and fifth divisional pages are rotated 180° and are then rearranged in a predetermined order. Next, image data ⑥ on a sixth divisional page left in the rear face region are rotated 180° and are moved to divisional regions (viii) and (vi) of the image memory together with image data ⑦ on a seventh divisional page. Further, image data ③ on a third divisional page left in the escaping region are rotated 180° and are moved to vacant regions (vii) and (v) of the image memory formed in the rear face region together with image data on a second divisional page.

The image data are edited and processed as a recording image for a folding-order copy. These image data are then read out of the image memory by a normal reading operation and are outputted to a printer. In this embodiment, the escaping region of size A3 is disposed in the image memory to rapidly edit and process the image data. However, when an escaping region for only the divisional pages is formed in the image memory without disposing any large escaping region, the recording image for a folding-order copy can be also obtained by moving and rotating the image data every divisional page, or by combining these divisional pages with each other. In this case, it is possible to use graphics LSI sold at a market. Further, the above image data can be also edited and processed by software without disposing any escaping region mentioned above.

Next, a covered-binding copying operation of the copying machine will next be explained when a covered-binding copying mode is selected. In this covered-binding copying mode, it is possible to perform a bookbinding operation in the shape of a bag in which recording images are arranged in a predetermined page order if a sheet of transfer paper is sequentially folded in the folding-order copying mode in accordance with folding lines recorded onto the sheet of transfer paper and is cut along cutting lines.

Figures 32A, 32B:
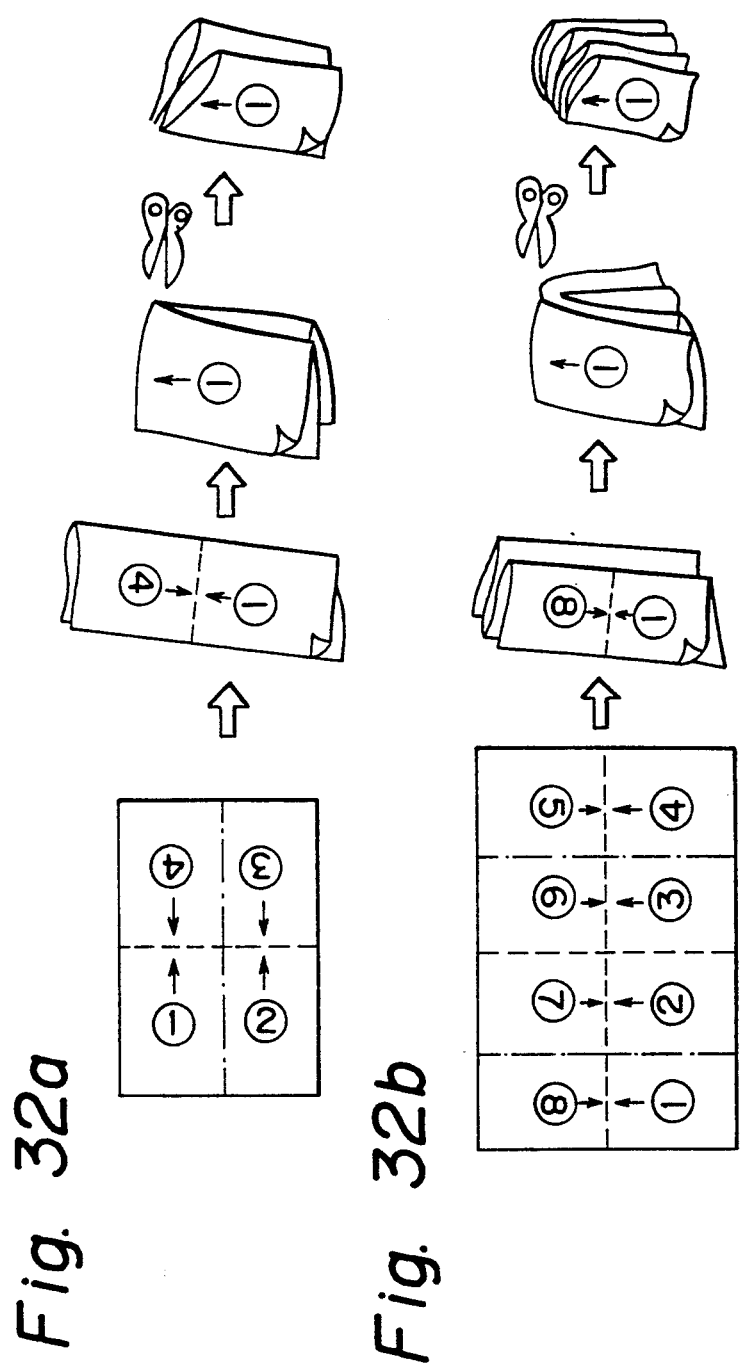
FIGS. 32a and 32b are explanatory views each showing sheets of transfer paper and a covered bookbinding method when a covered-binding copying mode is selected.

FIGS. 32a and 32b show examples of a copy discharged from the copying machine when the covered-binding copying mode is selected. FIGS. 32a and 32b also show the bookbinding operation using this copy. FIGS. 39 to 46 are flow charts of a control operation of the copying machine when an automatic document feeder (ADF) is used and the covered-binding copying mode is selected.

FIGS. 32a and 32b respectively show cases in which the left-hand side of the copy is opened and the divisional number N is set to 4 and 8. In FIGS. 32a and 32b, a reference numeral shows a page number of an original image or a divisional image and an arrow shows a direction of the image. As shown in these figures, the copy is folded along a top folding line shown by a one-dotted chain line "———" and is then folded along a bottom folding line shown by a broken line "- - -". Thereafter, the copy is further folded along a broken line "......" to form two folded sections. If these two folded sections are cut along this broken line "......", it is possible to make the covered-binding copy opened leftward on the first to fourth pages and the first to eighth pages. In the case of a covered-binding copy opened rightward, all the vertical directions of the recording images are opposite to the above vertical directions.

The copying machine is operated as follows in the folding-order copying mode, a single-sided copying mode and the original-replacing copying mode in accordance with the flow charts shown in FIGS. 39 to 42.

First, when a button for the folding-order copying mode is pushed down, the folding-order copying mode and the original-replacing copying mode are set in steps S-50 and S-51. Next, ten keys are operated to set the divisional number N and select an original pattern in steps S-52 and S-53. When a print starting button is then pushed down in a step S-54, the sheet-number counting value i is set to zero. When the original is fed, the original size sensor additionally disposed in the automatic document feeder (ADF) measures longitudinal and transversal sizes of the original in a step S-55.

Figure 40:
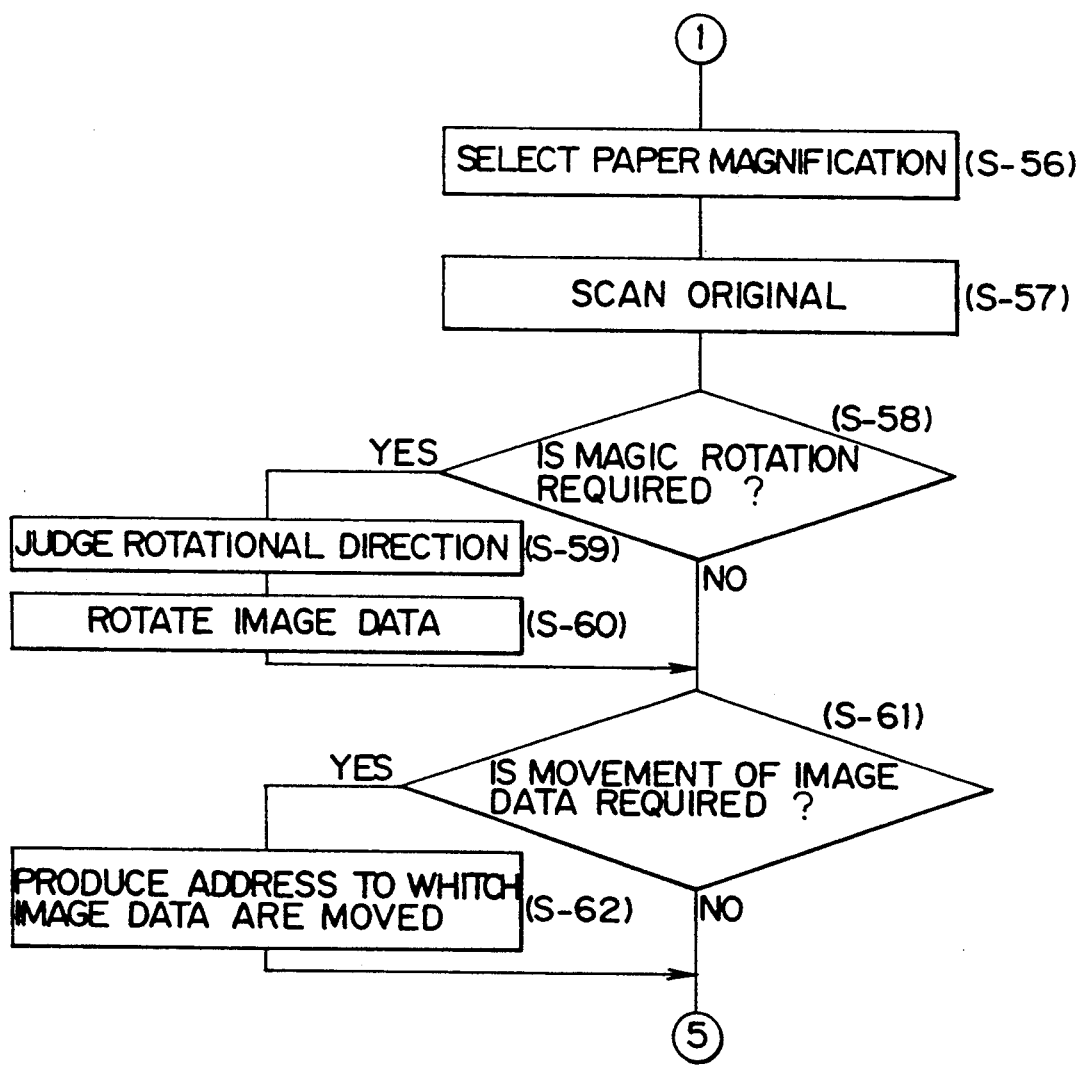
FIG. 40 is a flow chart of a control operation of the copying machine subsequent to the control operation shown in FIG. 39 when the covered-binding copying mode and the original-replacing copying mode are selected.

Thereafter, as shown in FIG. 40, a subroutine for selecting a paper magnification is executed in a step S-56. In a step S-57, the original is scanned by the scanner. In the next step S-58, it is judged whether the rotational processing of image data is required or not. This requirement of the rotational processing of image data is determined by a setting direction of the original, a setting direction of the sheet of transfer paper, a setting mode, the divisional number N and the sheet-number counting value i. For example, when the original is scanned by the scanner in the longitudinal direction and the divisional number N is equal to 4, it is necessary to rotate image data on the first page of the original by 180°. When the original is scanned by the scanner in the longitudinal direction and the divisional number N is equal to 8, it is necessary to rotate image data on the first page of the original rightward by 90°. The setting direction of the original is simultaneously judged when the original size is detected in a step S-55. A rotational direction of the image data is judged in a step S-59 if it is necessary to rotate the image data. The image data are then rotated in a step S-60. It is then judged in a step S-61 whether or not it is necessary to move the image data to storing regions within the page memories. If it is necessary to move the image data to the storing regions, address data are produced in a step S-62 in a memory region to which the image data are moved.

Figure 41:
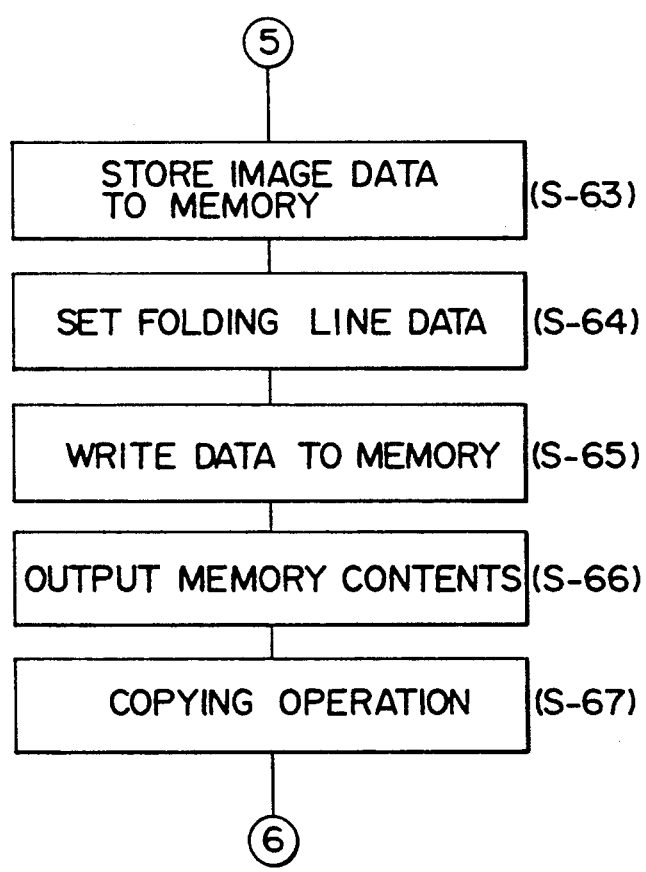
FIG. 41 is a flow chart of a control operation of the copying machine subsequent to the control operation shown in FIG. 40 when the covered-binding copying mode and the original-replacing copying mode are selected.

Next, in a step S-63 shown in FIG. 41, the image data are stored to the page memory region of addresses with respect to first or produced address data. Further, folding line data and white data are set in a step S-64 and are stored to a boundary region of an image unit in a step S-65. The image data, the folding line data and the white data stored to the page memories are outputted therefrom in a step S-66. Then, a normal copying operation is executed in accordance with these outputted data in a step S-67. When the step S-67 is completely executed, it is returned to the step S-54.

Figure 39:
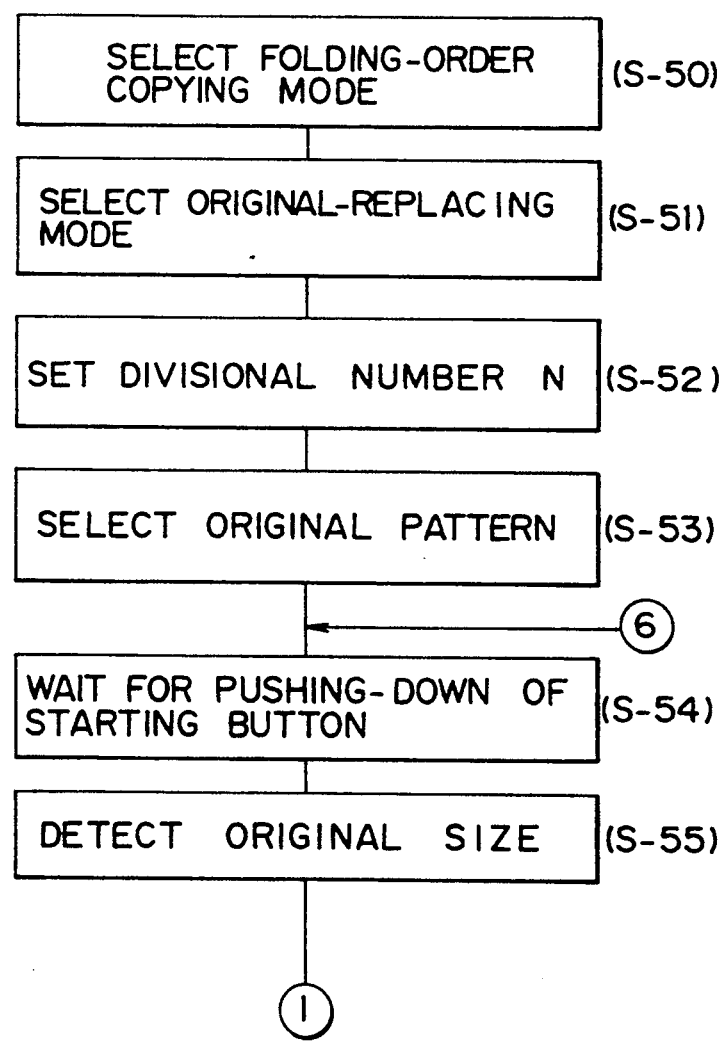
FIG. 39 is a flow chart of a control operation of the copying machine when a covered-binding copying mode and the original-replacing copying mode are selected.
Figure 42:
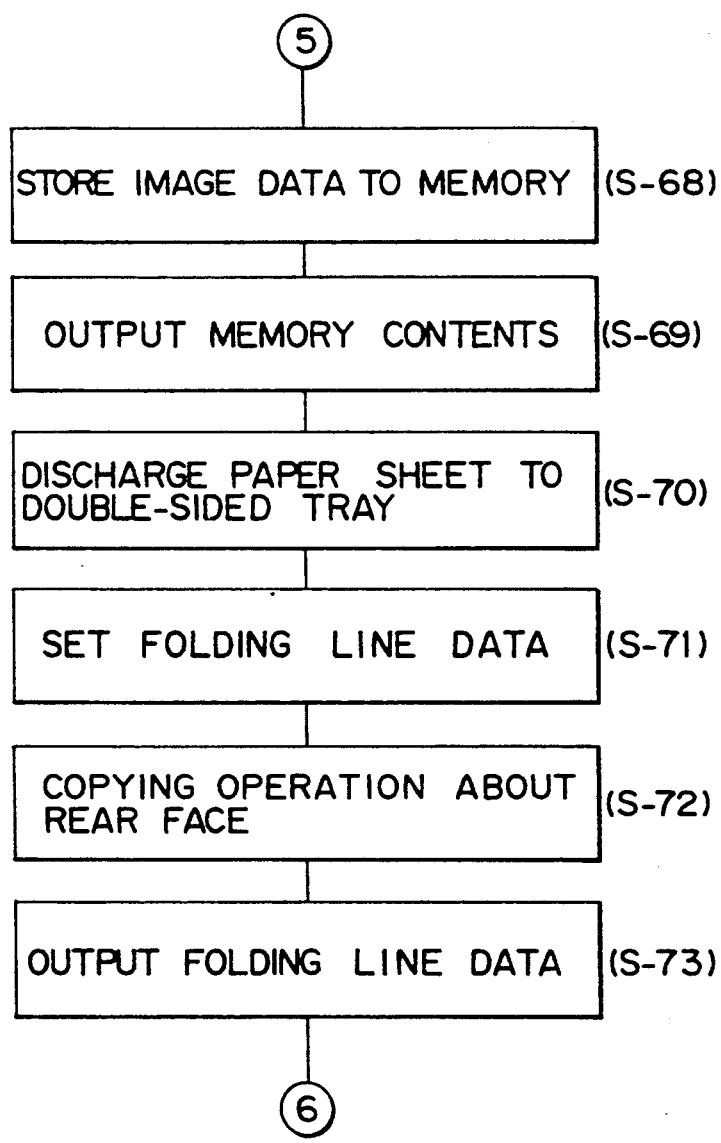
FIG. 42 is a flow chart of a control operation of the copying machine subsequent to the control operation shown in FIG. 40 when the covered-binding copying mode, the original-replacing copying mode and the double-sided copying mode are selected.
Figure 43:
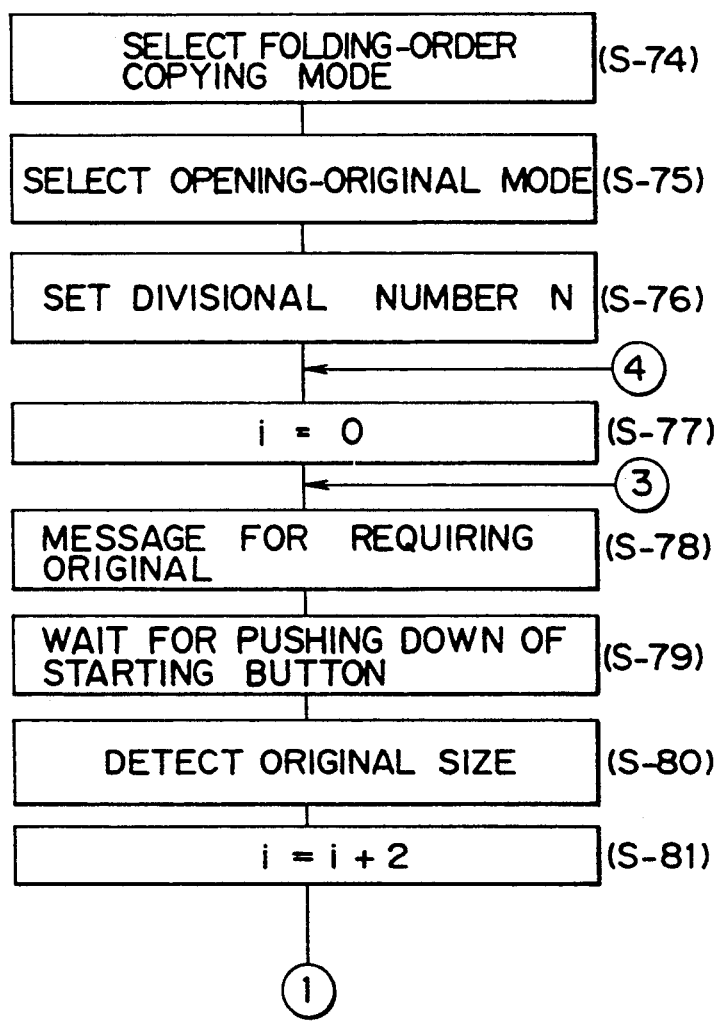
FIG. 43 is a flow chart of a control operation of the copying machine when the covered-binding copying mode and an opening-original copying mode are selected.

A copying operation of the copying machine in the double-sided copying mode is executed in accordance with the flow charts shown in FIGS. 39, 40 and 42. In the following description, only the flow chart shown in FIG. 42 will be briefly explained since the flow charts shown in FIGS. 39 and 40 are commonly used and already explained. The image data are stored into the page memories in a step S-68 and are then outputted to a printer in a step S-69, thereby executing the normal copying operation. A sheet of transfer paper having a printed original image thereon is discharged to a double-sided tray in a step S-70. Next, the folding line data are set in a step S-71 and are outputted from the page memories in a step S-73 together with the start of a rear face copying operation in a step S-72.

The copying machine is operated as follows in the folding-order copying mode, the single-sided in the folding-order copying mode, the single-sided copying mode and an opening-original copying mode in accordance with the flow charts shown in FIGS. 43, 34, 35 and 36. As shown in FIG. 20, the opening-original copying mode is a copying mode in which images of the bound original on two pages thereof composed of odd and even pages are read at one time and are stored to the page memories every page or divisional image on a page.

First, the button for the folding-order copying mode is pushed down in a step S-74. Thereafter, the opening-original copying mode is set in a step S-75. Thereafter, when the ten keys are operated to set the divisional number N in a step S-76, the sheet-number counting value i is set to zero in a step S-77. This counting value i is increased by two every time the opening original is read by the scanner. Next, a message for setting the original in the operating section is displayed in a step S-78. When the print starting button is then pushed down in a step S-79, the original size sensor additionally disposed in the scanner measures the longitudinal and transversal sizes of the original in a step S-80 when the original is scanned by the scanner. Further, the sheet-number counting value i is increased by two in a step S-81. The subsequent operations of the copying machine are performed in accordance with the above flow charts shown in FIGS. 34, 35 and 36.

In the case of the folding-order covered-binding copy of the opening original made by the above embodiment, odd and even page arrangements of the copy are opposite to those of the original. There is no problem when only the copy is used. However, it is preferable to set the page arrangements of the copy to be equal to those of the original in a case in which the original and the copy are checked in parallel with each other. In a page-aligning copying mode described later, a blank page is inserted as a first page of the copy so that it is possible to make a copy having the same page arrangements as the original.

Figure 44:
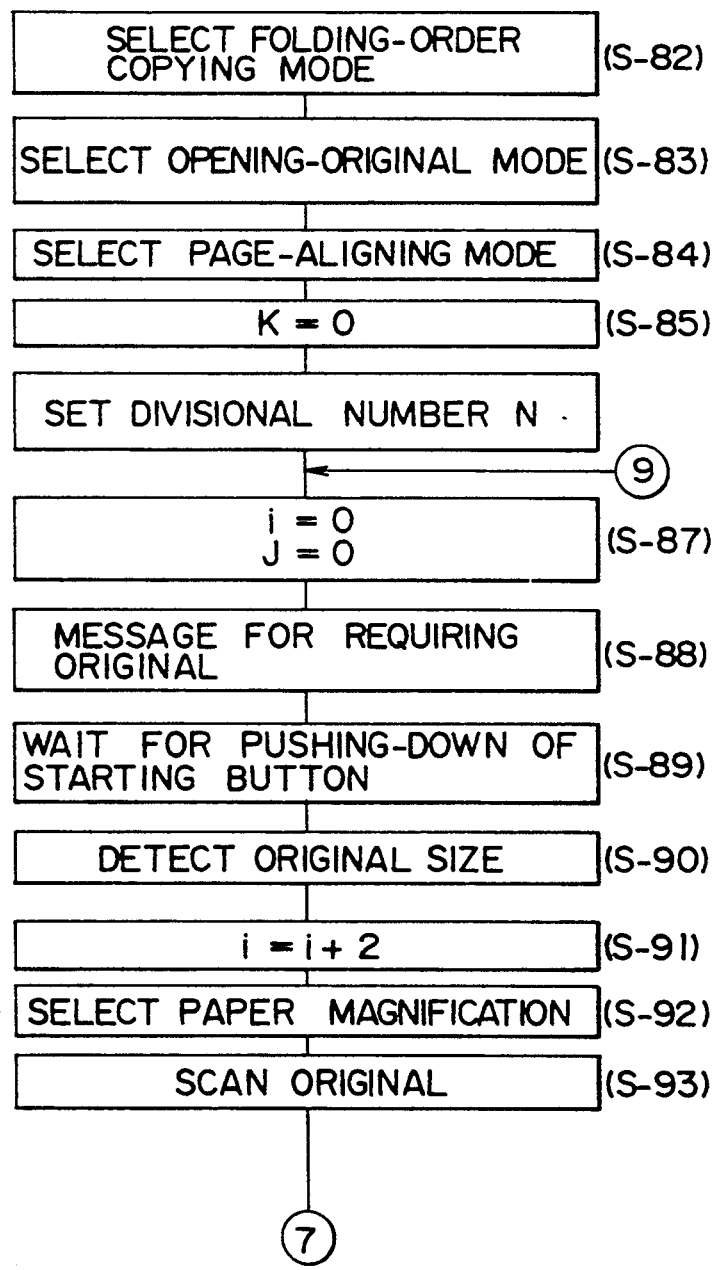
FIG. 44 is a flow chart of a control operation of the copying machine when the covered-binding copying mode, the opening-original copying mode and a page-aligning copying mode are selected.

A copying operation of the copying machine in the page-aligning copying mode will next be described in accordance with flow charts shown in FIGS. 44 to 46.

First, the button for the folding-order copying mode is pushed down in a step S-82. Thereafter, the opening-original copying mode and the page-aligning copying mode are set in steps S-83 and S-84. Then, a counting value K of a first-page judging counter is set to zero in a step S-85. Next, when the ten keys are operated to set the divisional number N in a step S-86, the sheet-number counting value i and a counting value J of a page-order feeding counter are set to zero in a step S87. Subsequent operating flows from a step S-88 to a step S-93 are similar to those in the normal opening-original copying mode shown in FIGS. 43 and 34. Accordingly, an explanation about the subsequent operating flow is omitted in the following description.

Figure 45:
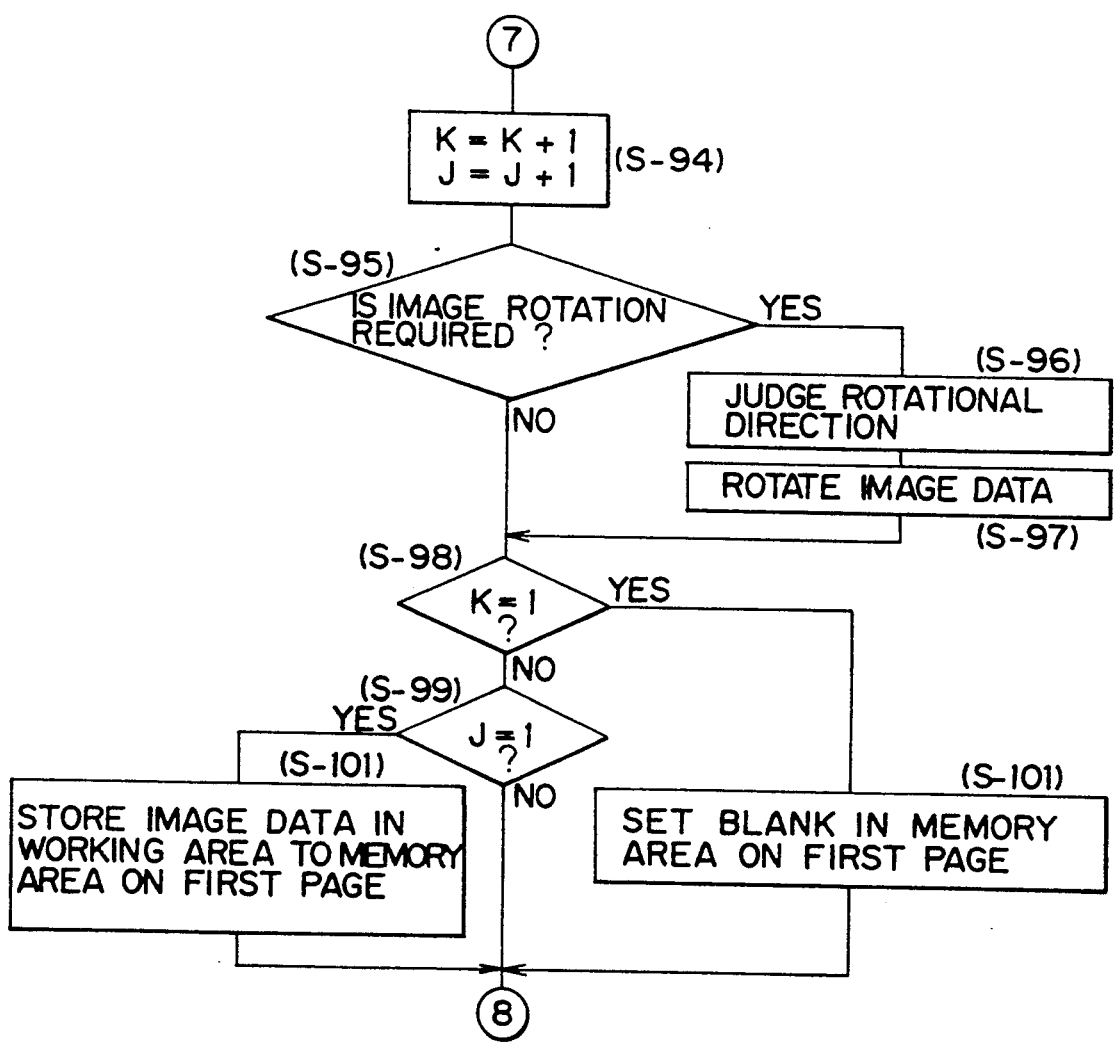
FIG. 45 is a flow chart of a control operation of the copying machine subsequent to the control operation shown in FIG. 44 when the covered-binding copying mode, the opening-original copying mode and the page-aligning copying mode are selected.

When the reading operation of the original is completely performed in the step S-93, the counting value K of the first-page judging counter and the counting value J of the page-order feeding counter are increased by one in a step S-94 shown in FIG. 45. Thereafter, it is judged in a step S-95 whether or not it is necessary to rotate image data. When it is direction of the image data is judged in a step S-96 and the image data are rotated in a step S-97. Thereafter, it is judged in a step S-98 whether the counting value K of the first-page judging counter is equal to one or not. If copying counting value K is equal to one, the copying machine sets blank data corresponding to a first page of the original and written to a memory region of the page memories for storing image data on the first page of the original in a step S-101. In contrast to this, if no counting value K is equal to one, it proceeds to a step S-99. In the step S-99, it is judged whether the counting value J of the page-order feeding counter is equal to one or not. If this counting value J is equal to one, the image data stored to a working area of the page memories are written in a step S-100 to the memory region of the page memories to which the image data of the original on the first page thereof are stored.

Figure 46:
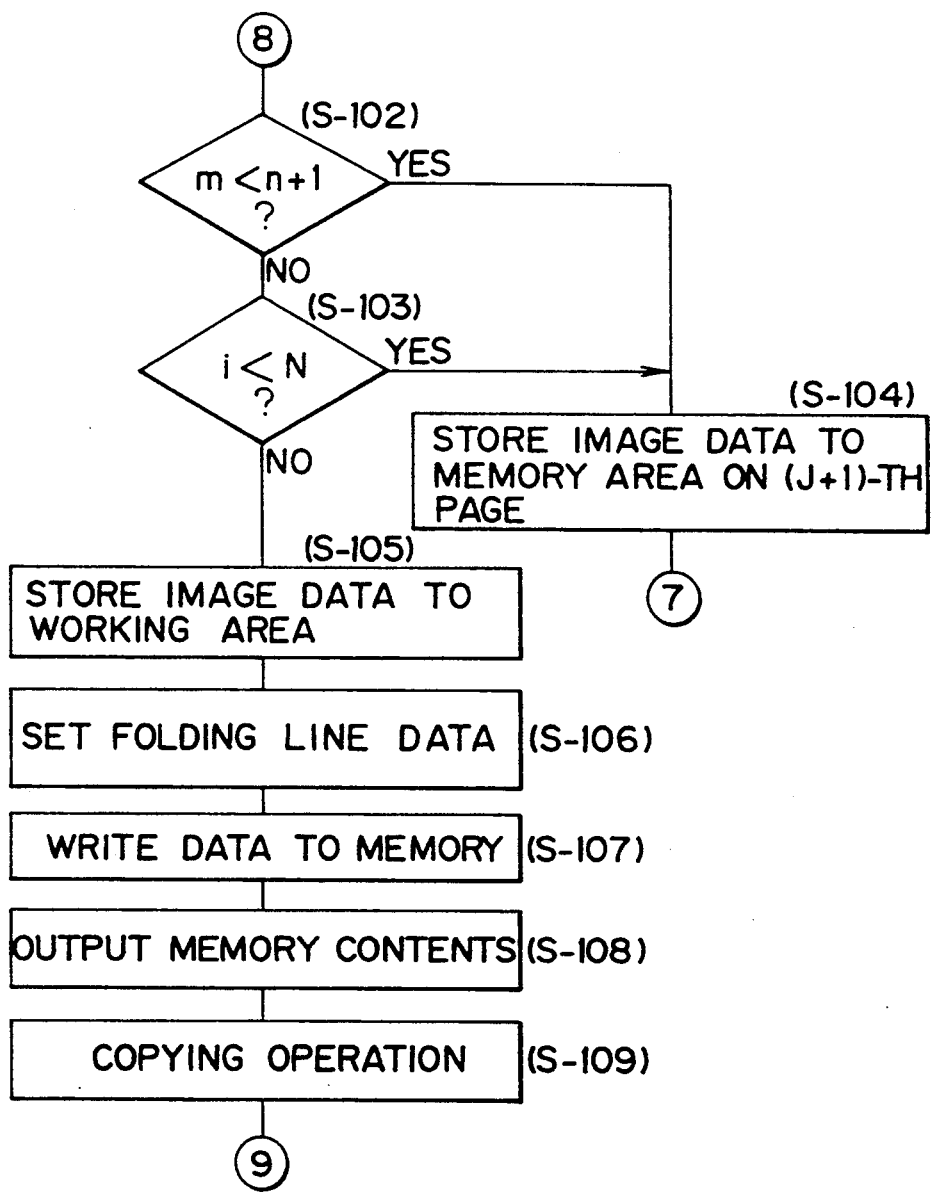
FIG. 46 is a flow chart of a control operation of the copying machine subsequent to the control operation shown in FIG. 45 when the covered-binding copying mode, the opening-original copying mode and the page-aligning copying mode are selected.

Next, it is judged in a step S-102 shown in FIG. 46 whether a counting value m of a main-scanning line counter is equal to or smaller than a set value n. When this judgment is YES, it proceeds to a step S-104. In contrast to this, when this judgment is NO, it proceeds to a step S-103. In this step S-103, it is judged whether the sheet-number counting value i is smaller than the divisional number N or not. When the sheet-number counting value i is smaller than the divisional number N, the image data are written in the step S-104 to a memory region of the page memories to which image data of the original on a (J+1)-th page thereof are stored. Thereafter, it is returned to the step S-94. When the sheet-number counting number i is equal to or greater than the divisional number N in the step S-103, the image data on N-pages of the original are stored to the working area in a step S-105. Next, folding line data and white data are set in a step S-106 and are stored to a boundary region of an image unit in a step S-107. The image data, the folding line data and the white data stored to the page memories are outputted therefrom in a step S-108 and the normal copying operation is executed in accordance with these outputted data in a step S-109. When the normal copying operation is completely performed in the step S-109, it is returned to the step S-87. In the step S-87, the sheet-number counting value i and the counting value J of the page-order feeding counter are cleared. Accordingly, when it proceeds to the steps S-98 and S-99, the judgments in these steps S-98 and S-99 are respectively set to NO and YES and it proceeds to the step S-100. In the step S-100, the image data stored to the working area are written to the memory region of the page memories for storing image data on a new first page of the original. The above-mentioned operations are repeatedly performed so that a folding-order copy is made.

A folding-order image forming apparatus in accordance with a third embodiment of the present invention will next be described. This image forming apparatus has a recyclic automatic document feeder (which is briefly called RADF in the following description) and one frame memory. The recyclic automatic document feeder can discharge an original once fed onto the contact glass 39 onto another original set in a standby state and can cyclically feed the original many times.

In FIGS. 21a to 21d, keys for the folding-order copying mode, the double-sided copying mode and a two-divisional copying mode are pushed down and a copying operation is performed. FIGS. 21a to 21d show storing states of image data stored to two regions (i) and (ii) of one frame memory having size A3 with the passage of time when the copying operation is performed. Namely, these image data are stored to the two regions (i) and (ii) of a page memory every size A4.

Figure 21A:
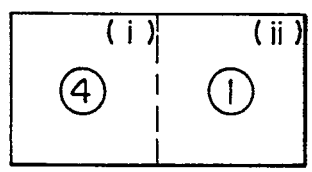
FIGS. 21a to 21d are explanatory views showing storing states of image data stored to an image memory when a folding-order copying mode, a double-sided copying mode and a two-divisional copying mode are selected in a copying machine in accordance with a third embodiment of the present invention.

When the print starting key is pushed down, a first sheet of the original arranged on the recyclic automatic document feeder (RADF) is conveyed onto the contact glass 39 and is scanned by the scanner. Thus, image data ① on this original sheet are stored to the region (ii) of the page memory having size A4. The first sheet of the original is then discharged and stacked onto another original set in a standby state. Similar to the first sheet of the original, after second and third sheets of the original are next fed from the feeder, these second and third sheets are discharged and stacked onto the first sheet of the original without scanning the second and third sheets by the scanner. Then, a fourth sheet of the original is fed from the feeder and image data ④ thereon are read and stored to the region (i) of the page memory having size A4. When the page memory is filled with the image data ① and ④ as shown in FIG. 21a, these image data are read out of the page memory and are recorded onto a front face of a fed sheet of transfer paper. This sheet of transfer paper having an image thereon is fed to the double-sided reversing unit IV so as to feed this sheet again.

Figure 21B:
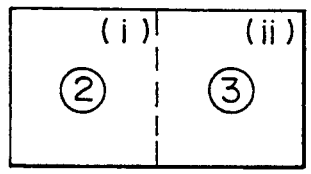
Figure 21C:
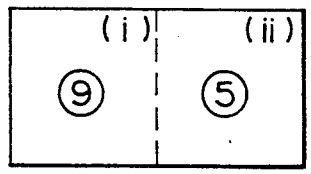
Figure 21D:
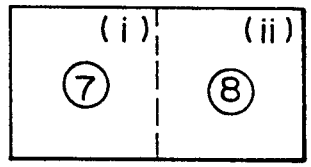

In the meantime, the original is cyclically fed and discharged repeatedly until the second sheet of the original reaches a taking-in position of the recyclic automatic document feeder (RADF). Thereafter, the second sheet of the original is fed and image data ② thereon are read and stored to the region (i) of the page memory having size A4. Next, a third sheet of the original is fed and image data ③ thereon are stored to the region (ii) of the page memory having size A4. When the page memory is filled with the image data ② and ③ as shown in FIG. 21b, these image data are read out of the page memory and are recorded onto a rear face of the sheet of transfer paper fed again. In this third embodiment, folding line data and white data having a constant width are also stored to the page memory between the two regions (i) and (ii). Accordingly, a margin and a folding line are formed between outputted images. As shown in FIGS. 21c and 21d, the above-mentioned operations are repeatedly performed until there is no original left unrecorded.

Figure 22A:
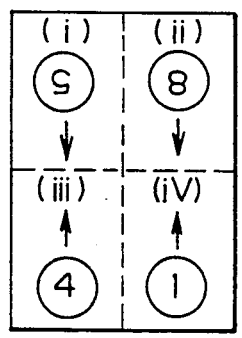
FIGS. 22a and 22b are explanatory views showing storing states of the image data stored to the image memory when the folding-order copying mode, the double-sided copying mode and a four-divisional copying mode are selected in the copying machine in the third embodiment of the present invention.
Figure 22B:
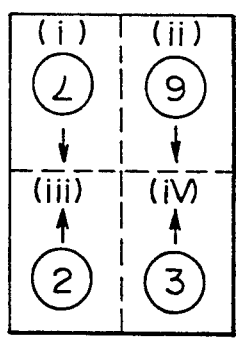

In FIGS. 22a and 22b, keys for the folding-order copying mode, the double-sided copying mode and a four-divisional copying mode are pushed down and a copying operation is performed. FIGS. 22a and 22b show storing states of image data stored to four regions (i), (ii), (iii) and (iv) every size A5 in one page memory of size A3 with the passage of time when the copying operation is performed. In this case, as shown by arrows in FIGS. 22a and 22b, a writing order of the image data with respect to the page memory in the case of the two regions (i) and (ii) is different from that in the case of the two regions (iii) and (iv).

Similar to the two-divisional copying mode, a first sheet of the original is first fed and image data ① thereon are read and stored to the region (iv) of the page memory having size A5. No second and third sheets of the original are next fed and discharged. Fourth and fifth sheets of the original are fed and image data ④ and ⑤ thereon are respectively read and stored to the regions (iii) and (i) in a state in which writing directions of these image data are different from each other. No sixth and seventh sheets of the original are fed and discharged. An eighth sheet of the original is fed and image data ⑧ thereon are read and stored to the region (ii). When all the storing regions of the page memory are filled with the image data as shown in FIG. 22a, white data and folding line data are written to the page memory between the respective storing regions. Thereafter, the white data and the folding line data are read out of the page memory and are recorded onto a front face of a fed sheet of transfer paper. This sheet of transfer paper having images thereon is then fed to the double-sided reversing unit IV to feed this sheet again. Similar to the above case, image data ⑦, ⑥, ② and ③ are reversed in accordance with necessity and are completely stored to the respective four regions (i), (ii), (iii) and (iv) as shown in FIG. 22b. Thereafter, these image data are read out of the page memory and are recorded onto a rear face of the sheet of transfer paper fed again.

Figure 23A:
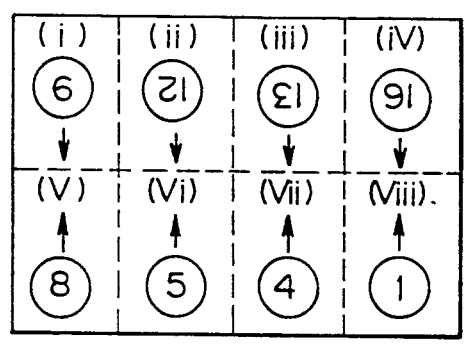
FIGS. 23a and 23b are explanatory views showing storing states of the image data stored to the image memory when the folding-order copying mode, the double-sided copying mode and an eight-divisional copying mode are selected in the copying machine in the third embodiment of the present invention.
Figure 23B:
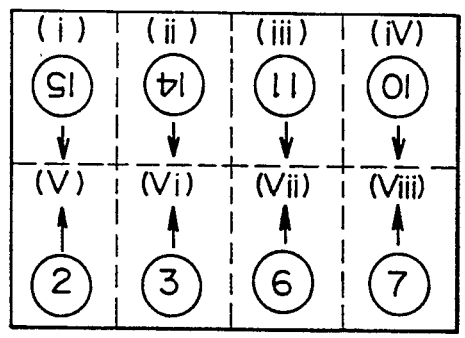

In FIGS. 23a and 23b, similar to the above case, a key for an eight-divisional copying mode is pushed down and a copying operation is performed. FIGS. 22a and 22b show storing states of image data stored to eight regions (i) to (viii) every size A6 in one page memory of size A3 with the passage of time when the copying operation is performed. In this case, writing and reading operations of the image data with respect to the page memory are similar to those in the above four-divisional case. Accordingly, an explanation about these writing and reading operations is omitted in the following description.

A folding-order image forming apparatus in accordance with a fourth embodiment of the present invention will next be described. This image forming apparatus has a normal automatic document feeder (ADF) and one frame memory. In FIGS. 24a to 24d, keys for a folding-order copying mode, a double-sided copying mode, a two-divisional copying mode are pushed down and a copying operation is performed. FIGS. 24a to 24d show storing states of image data stored to two regions (i) and (ii) every size A4 in one page memory of size A3 with the passage of time when the copying operation is performed.

Figure 24A:
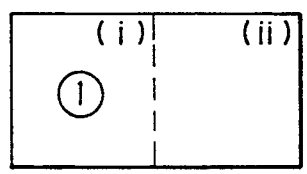
FIGS. 24a to 24d are explanatory views showing storing states of image data stored to the image memory when a folding-order copying mode, a double-sided copying mode and a two-divisional coping mode are selected in a coping machine in accordance with a fourth embodiment of the present invention.
Figure 24B:
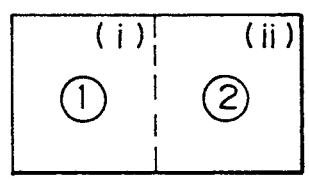
Figure 24C:
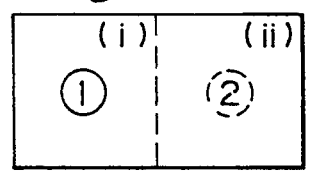
Figure 24D:
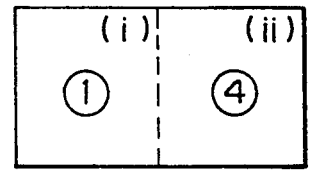

First, a first sheet of the original is fed and image data ① thereon are read and stored to the region (i) of the page memory having size A5 as shown in FIG. 24a. Similarly, a second sheet of the original is fed and image data ② thereon are read and stored to the region (ii) of the page memory having size A5. When the image data ② are completely stored to this region (ii) as shown in FIG. 24b, the image data ② are immediately read out of the page memory and are recorded onto a rear face of a fed sheet of transfer paper. Subsequently, a third sheet of the original is fed and image data thereon are read and recorded onto a remaining portion of the rear face of the sheet of transfer paper as they are. This sheet of transfer paper having images thereon is fed to the double-sided reversing unit IV to feed this sheet again. Next, a fourth sheet of the original is fed and image data ④ thereon are read and stored to the region (ii) of the page memory having size A5 instead of the image data ② as shown in FIG. 24c. When all the storing regions of the page memory are filled with the image data as shown in FIG. 24d, these image data are read out of the page memory and are recorded onto a front face of the sheet of transfer paper fed again. Subsequently, the writing, reading and recording operations with respect to the page memory are similarly performed repeatedly.

As mentioned above, in accordance with first and second structures of the present invention, an image forming apparatus has an image rotational processing means and a memory region control means. The image rotational processing means rotates an image by judging necessity of rotational processing of the image every memory region. The operation of an image signal memory means is controlled in a memory region thereof. When a folding-order image forming mode is selected, images on two or four pages are respectively recorded onto two equal divisional regions of one sheet of recording paper. The sheet of recording paper having the images thereon is simply folded or cut on a boundary of a unit image. Thus, it is possible to obtain one or plural sheets of recording paper having images thereon and formed in an opening shape in which the recording images are arranged in a desirable order.

In accordance with third and fourth structures of the present invention, the image forming apparatus has an image divisional means for processing an image signal stored to the image signal memory means and dividing read data of an original image into a plurality of divisional image data. Accordingly, the original image data constructed by a plurality of unit images can be automatically converted to image data every unit image. Therefore, it is easy to read the original every unit image and an image can be formed on the sheet of recording paper without any waste.

In accordance with a fifth structure of the present invention, the image forming apparatus has an image figure combining means for combining the original image with another figure image. Accordingly, an image provided by combining the original image with another figure image can be recorded onto the sheet of recording paper.

In accordance with sixth and seventh structures of the present invention, when a folding-order image forming mode is selected, $2^n$ divisional images are respectively formed onto $2^n$ equal divisional regions of the sheet of recording paper where n designates an integer. Accordingly, many original images can be efficiently recorder onto the sheet of recording paper in an opening shape.

In accordance with eighth to tenth structures of the present invention, when the folding-order image forming mode is selected, $2^n \times 2$ divisional images are respectively formed onto $2^n$ equal divisional regions of the sheet of recording paper where n designates an integer. Accordingly, many original images can be efficiently recorded onto both sides of the sheet of recording paper in an opening shape.

In accordance with an eleventh structure of the present invention, the original image is optically read and is converted to an electric signal by a photoelectric converting means. This electric signal is converted to a digital signal by an analog/digital (A/D) converting means and is stored to the image signal memory means, thereby easily processing the original image.

In accordance with a twelfth or fifteenth structure of the present invention, an original size is judged by an original size judging means and a zoom ratio of the original image is set by a zoom ratio setting means. This zoom ratio is determined by a zoom ratio determining means based on information of the original size and information of a recording paper size, or a divisional number of a recording image. Accordingly, the original image can be automatically recorded efficiently onto the sheet of recording paper in an opening shape irrespective of the sizes of the original and the recording paper.

In accordance with a thirteenth structure of the present invention, indicative patterns of a folding line, a folding order, a cutting line, etc. are generated on a divisional boundary of the sheet of recording paper by an indicative pattern generating means. The indicative patterns and an image provided from the image signal memory means are combined with each other by an image combining means. Accordingly, it is easy to fold and cut the sheet or recording paper having images thereon as after-treatment.

In accordance with a fourteenth structure of the present invention, a marginal region is formed in the vicinity of the divisional boundary of the sheet of recording paper by a binding-margin forming means. Accordingly, it is possible to prevent the original image from having a bad appearance and being cut by folding and cutting the sheet of recording paper having images thereon as after-treatment.

In accordance with a sixteenth structure of the present invention, the indicative patterns generated by the indicative pattern generating means and the image provided from the image signal memory means are formed by the memory region control means on faces of the sheet of recording paper different from each other when a double-sided image forming mode is selected. Accordingly, an image forming side of the sheet of recording paper has a good appearance when the sheet of recording paper having images thereon is folded and cut as after-treatment.

In accordance with a seventeenth structure of the present invention, a write-starting position setting means designates a write starting position of the image signal memory means. A write-completing position setting means designates a write completing position of the image signal memory means. A data-unit stepping-amount setting means designates a write-data unit stepping amount. The memory region control means controls a writing operation of the image data in accordance with the designated write starting position, the designated write completing position and the designated write-data unit stepping amount. Accordingly, the image forming apparatus can be constructed by a circuit structure cheaply manufactured without reducing an image forming speed.

In accordance with an eighteenth structure of the present invention, image processings such as rotation of an image are performed by a simplified circuit structure when image data are written to an image memory. Accordingly, in comparison with the general image forming apparatus, cost of the circuit structure can be reduced and no image forming speed is reduced so much when the circuit structure is used in the image forming apparatus such as a copying machine.

Many widely different embodiments of the present invention may be constructed without departing from the spirit and scope of the present invention. It should be understood that the present invention is not limited to the specific embodiments described in the specification, except as defined in the appended claims.

What is claimed is:

1. A folding-order image forming apparatus comprising:

storage means for storing a digital image signal;

forming means for forming a recording image on a recording paper in accordance with the image signal output from said storage means;

information number setting means for setting an information number showing the number of information units included in one original;

dividing number setting means for setting a dividing number showing the number of image information units recorded on one recording paper; and storage area control means for controlling a storage area in said storage means for the digital image signal per said image information unit, in accordance with:

(1) an information number set by said information number setting means; and (2) a dividing number set by said dividing number setting means.

2. The folding-order image forming apparatus of claim 1, further comprising:

first discriminating means for discriminating a rotating angle of said digital image signal per said image information units, in accordance with the information number of said information number setting means and the dividing number of said dividing number setting means;

wherein said storage area controlling means includes means for controlling said recording area in accordance with an information number of said information number setting means and a dividing number of said dividing number setting means, and with discriminating information from said first discriminating means.

3. The folding-order image forming apparatus of claim 1, further comprising:

recording setting means for setting a "single side recording" setting or a "both side recording" setting regarding said recording paper;

wherein said storage area controlling means includes means for controlling said recording area in accordance with an information number set by said information number setting means, with a dividing number set by said dividing number setting means, and with a recording setting of said recording setting means.

4. The folding-order image forming apparatus of claim 3, further comprising:

first discriminating means for discriminating a rotating angle of said digital image signal per said image information units in accordance with an information number of said information number setting means, a dividing number of said dividing number setting means, and a recording setting of said recording setting means;

wherein said storage area controlling means includes means for controlling said recording area in accordance with an information number of said information number setting means, a dividing number of said dividing number setting means and a setting of said recording setting means, and discriminating information from said first discriminating means.

5. The folding-order image forming apparatus of claim 3, wherein said storage area controlling means includes:

writing beginning position designating means for designating a writing beginning position in said storage means;

writing ending position designating means for designating a writing ending position; and data unit stepping amount designating means for designating a writing data unit stepping amount for stepping a writing position;

wherein information from said writing beginning position designating means, said writing ending position designating means, and said data unit stepping amount designating means are designated in accordance with an information number from said information number setting means and a dividing number from said dividing number setting means; and the storage area for said storage means of the digital image signal is controlled in accordance with information from said writing beginning position designating means, said writing ending position designating means, and said data unit stepping amount designating means.

6. The folding-order image forming apparatus of claim 3, further comprising:

a recyclic automatic document feeder for supplying the original placed on an original loading pedestal to a contact glass and for discharging the original to said original loading pedestal; and second discriminating means for discriminating whether or not, it is necessary to scan the original supplied to said contact glass, in accordance with an information number of said information number setting means, a dividing number of said dividing number setting means, and a recording setting of said recording setting means.

7. An image data outputting circuit, comprising:

a) an image memory for storing image data read line by line; and b) image memory control means for controlling input and output of image data into and out of said image memory, wherein said image memory control means includes:

1) writing beginning position setting means for designating a writing beginning position of the image memory;

2) writing ending position setting means for designating a writing ending position;

3) data unit stepping amount setting means for designating a writing data unit stepping amount for stepping a writing position; and 4) means for controlling writing of the image data in accordance with designated information from said writing beginning position setting means, said writing ending position setting means, and said data unit stepping amount setting means.

8. The folding-order image forming apparatus of claim 7, further comprising:

original size discriminating means for discriminating an original size;

zooming ratio setting means for setting a zooming ratio of the recording image; and zooming ratio determining means for determining said zooming ratio as a comparison of (1) original size information obtained from said original size discriminating means, and (2) recording paper size information.

9. The folding-order image forming apparatus of claim 7, further comprising:

indicative pattern generating means for forming indicative patterns including a folding line, a folding order, and/or a cutting line, on a divisional boundary of the sheet of the recording paper; and image combining means for combining the indicate patterns generated by the indicative pattern generating means with an image provided from the image memory means.

10. The folding-order image forming apparatus of claim 7, further comprising:

binding-margin forming means for forming a marginal region in the vicinity of a divisional boundary of the sheet of recording paper.

11. The folding-order image forming apparatus of claim 8, wherein:

the zooming ratio determining means includes means for determining the zooming ratio on the basis of the original size information obtained from said original size discriminating means, said recording paper size information, and said dividing number of the recording image.

12. The folding-order image forming apparatus of claim 9, wherein:

said storage area controlling means includes means for forming, on the respective sides of the recording paper, the indicative patterns generated from said indicative pattern generating means and the image from said image signal storage means, when a "both sides" image forming mode for forming the recording image on both sides of the recording paper is selected.

13. The folding-order image forming apparatus of claim 1, wherein said storage area controlling means includes:

writing beginning position designating means for designating a writing beginning position in said storage means;

writing ending position designating means for designating a writing ending position; and data unit stepping amount designating means for designating a writing data unit stepping amount for stepping a writing position;

wherein respective designated information from said writing beginning position designating means, said writing ending position designating means and said data unit stepping amount designating means, are designated in accordance with an information number of said information number setting means and a dividing number of said dividing number setting means; and wherein the storage area for said storage means of the digital image signal is controlled in accordance with said designated information.

14. The folding-order image forming apparatus of claim 1, further comprising:

original size discriminating means for discriminating an original size;

zooming ratio setting means for setting a zooming ratio of the recording image; and zooming ratio determining means for determining said zooming ratio as a comparison of (1) original size information obtained from said original size discriminating means, and (2) recording paper size information.

15. The folding-order image forming apparatus of claim 1, further comprising:

indicative pattern generating means for forming indicative patterns including a folding line, a folding order, and/or a cutting line, on a divisional boundary of the sheet of the recording paper; and image combining means for combining the indicative patterns generated by the indicative pattern generating means with an image provided from the image memory means.

16. The folding-order image forming apparatus of claim 1, further comprising:

binding-margin forming means for forming a marginal region in the vicinity of a divisional boundary of the sheet of recording paper.

17. The folding-order image forming apparatus of claim 14, wherein:

the zooming ratio determining means includes means for determining the zooming ratio on the basis of the original size information obtained from said original size discriminating means, said recording paper size information, and said dividing number of the recording image.

18. The folding-order image forming apparatus of claim 15, wherein:

said storage area controlling means includes means, for forming, on the respective sides of the recording paper, the indicative patterns generated from said indicative pattern generating means and the image from said image signal storage means, when a "both sides" image forming mode for forming the recording image on both sides of the recording paper is selected.

* * * * *